United States Patent
Hannebauer et al.

(10) Patent No.: US 7,740,440 B2
(45) Date of Patent: Jun. 22, 2010

(54) CONTINUOUS BREAKDOWN HOISTS

(75) Inventors: James Bruce Hannebauer, Salmon Arm (CA); Ronald James Hougen, Salmon Arm (CA)

(73) Assignee: Mill Tech Industries, Salmon Arm, CA (US)

( * ) Notice: Subject to any disclaimer, the term of this patent is extended or adjusted under 35 U.S.C. 154(b) by 347 days.

(21) Appl. No.: 11/858,217

(22) Filed: Sep. 20, 2007

(65) Prior Publication Data

US 2009/0081018 A1   Mar. 26, 2009

(51) Int. Cl.
B65G 59/02   (2006.01)
B65H 3/00   (2006.01)

(52) U.S. Cl. .................. 414/796.7; 414/422; 414/795.8; 414/419; 196/445

(58) Field of Classification Search ................ 198/406, 198/444–445; 209/521; 271/159, 9.08; 414/270–271, 414/404, 413, 414, 416–419, 422, 425, 795.4, 414/795.7–795.9, 796, 796.2–796.3, 796.5, 414/796.7, 796.8, 798.2, 798.6, 798.7, 798.8
See application file for complete search history.

(56) References Cited

U.S. PATENT DOCUMENTS

| | | | |
|---|---|---|---|
| 1,549,149 A | 8/1925 | Pollock | |
| 1,676,957 A | 7/1928 | Leaver et al. | |
| 3,754,671 A * | 8/1973 | Weida | 414/404 |
| 4,640,655 A | 2/1987 | Jacobsen | |
| 4,838,748 A | 6/1989 | Johnson | |
| 5,249,915 A | 10/1993 | Ritola | |
| 5,795,126 A | 8/1998 | Newnes | |
| 5,879,129 A | 3/1999 | Newnes et al. | |

FOREIGN PATENT DOCUMENTS

| | | |
|---|---|---|
| CA | 2121401 | 10/1995 |
| SE | 161631 | 12/1957 |
| SE | 7405427 | 1/1976 |
| SE | 7501507.3 | 3/1977 |
| SU | 906358 | 11/1975 |

* cited by examiner

*Primary Examiner*—Gregory W Adams
(74) *Attorney, Agent, or Firm*—Oyen Wiggs Green & Mutala LLP

(57) ABSTRACT

A breakdown hoist has a secondary stage that permits continuous operation. The breakdown hoist may be run with the secondary stage disabled. In some embodiments a primary and secondary stage can discharge lumber simultaneously onto two conveyors. Providing two conveyors can increase surge capacity.

12 Claims, 28 Drawing Sheets

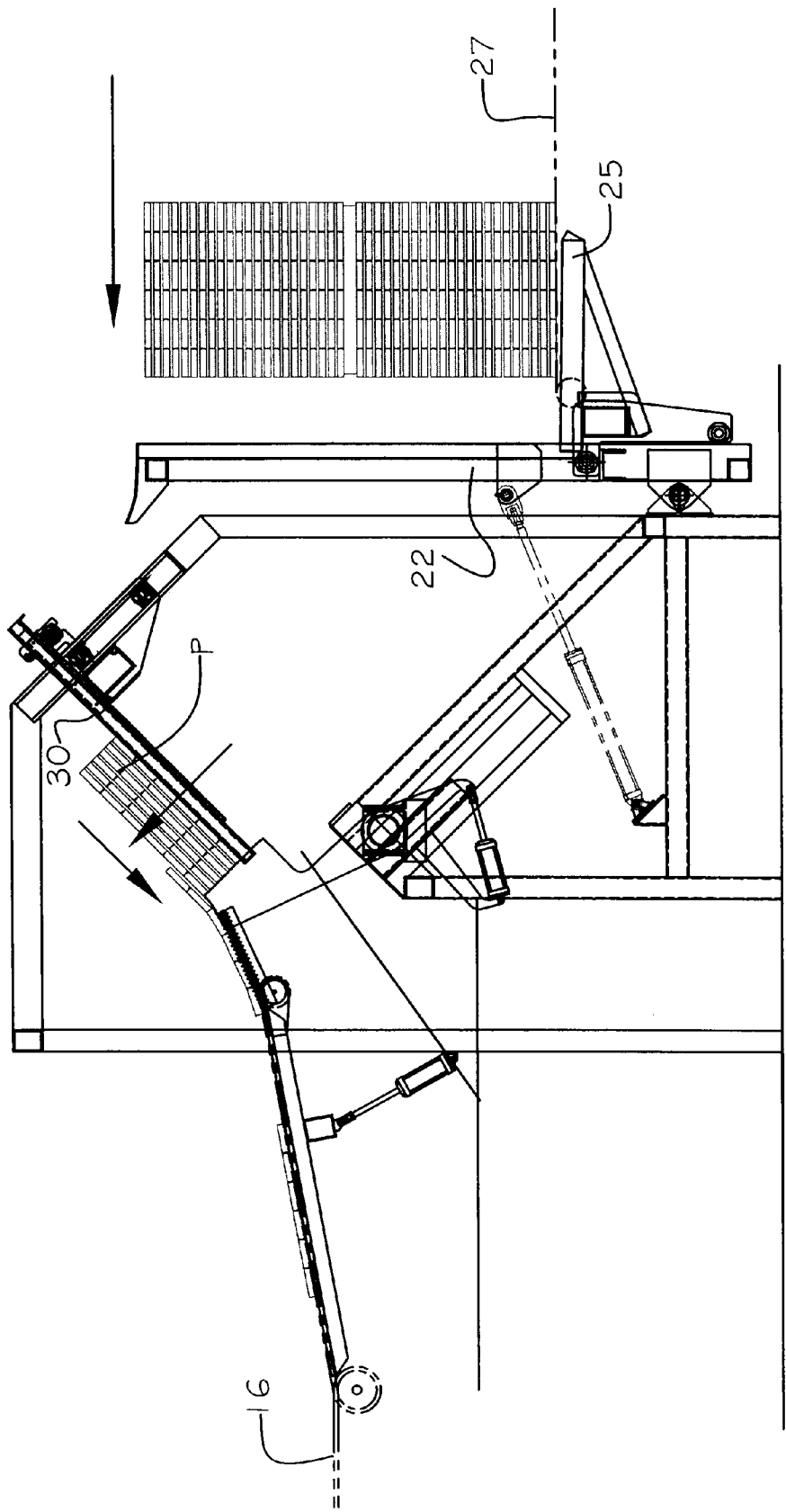

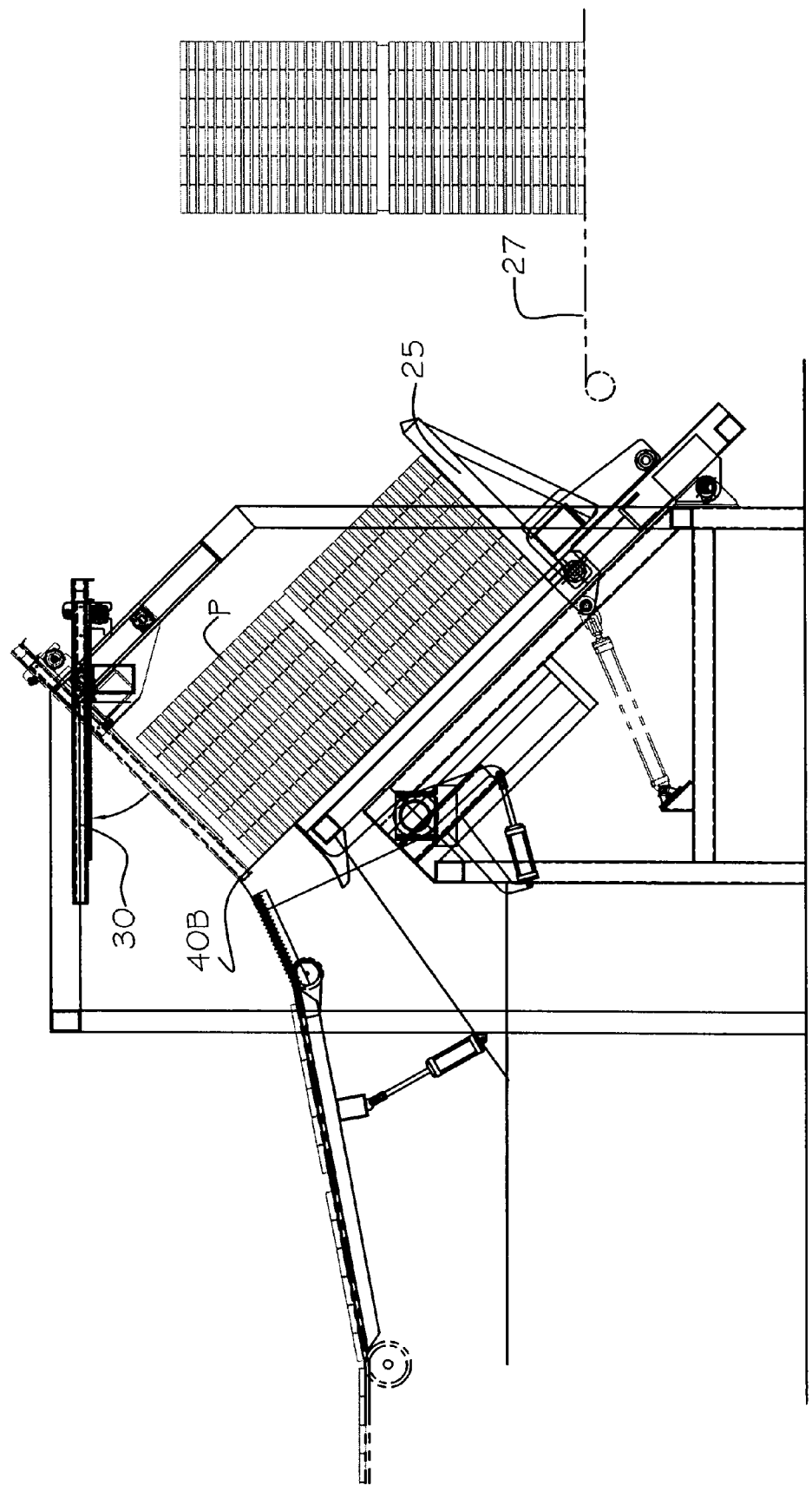

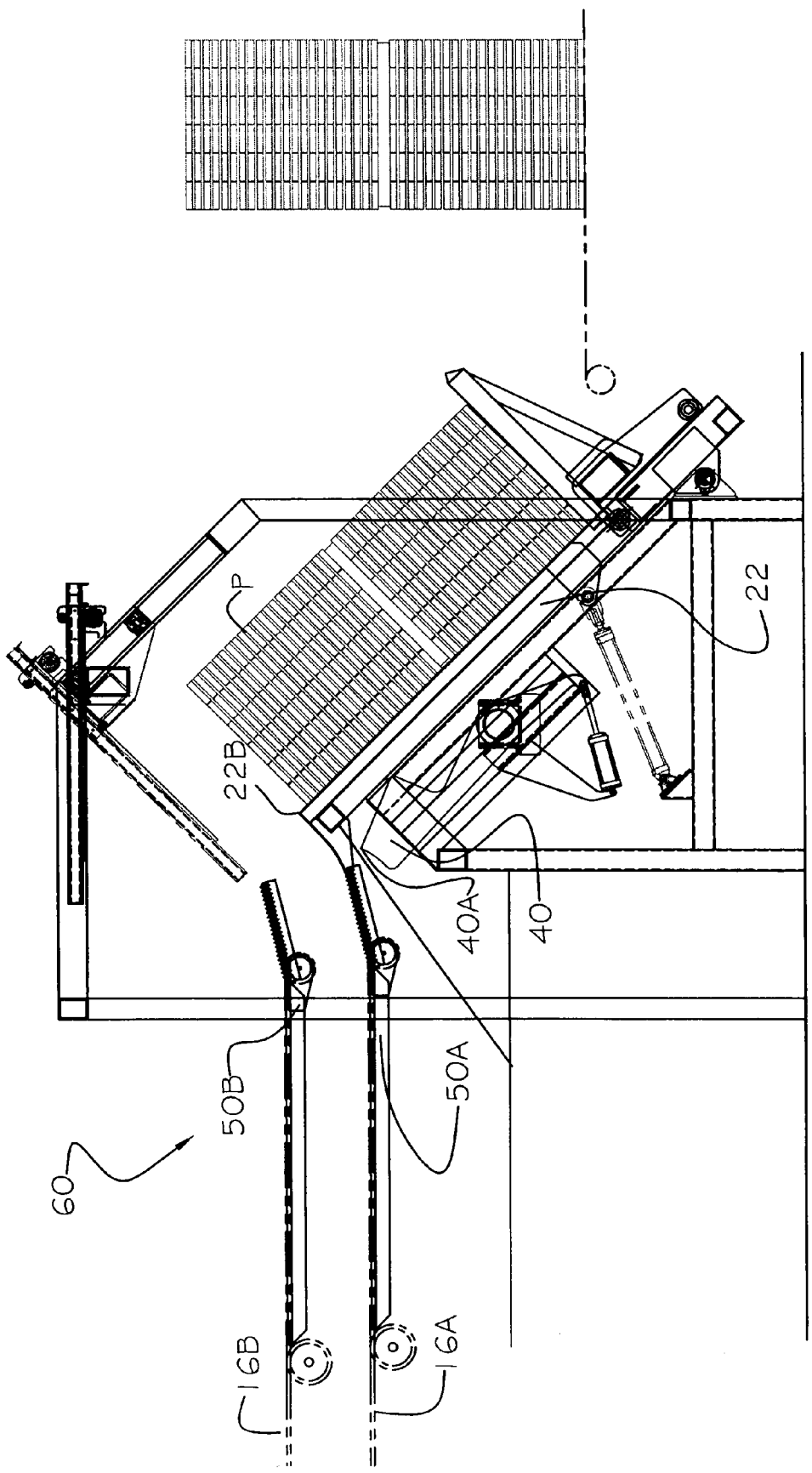

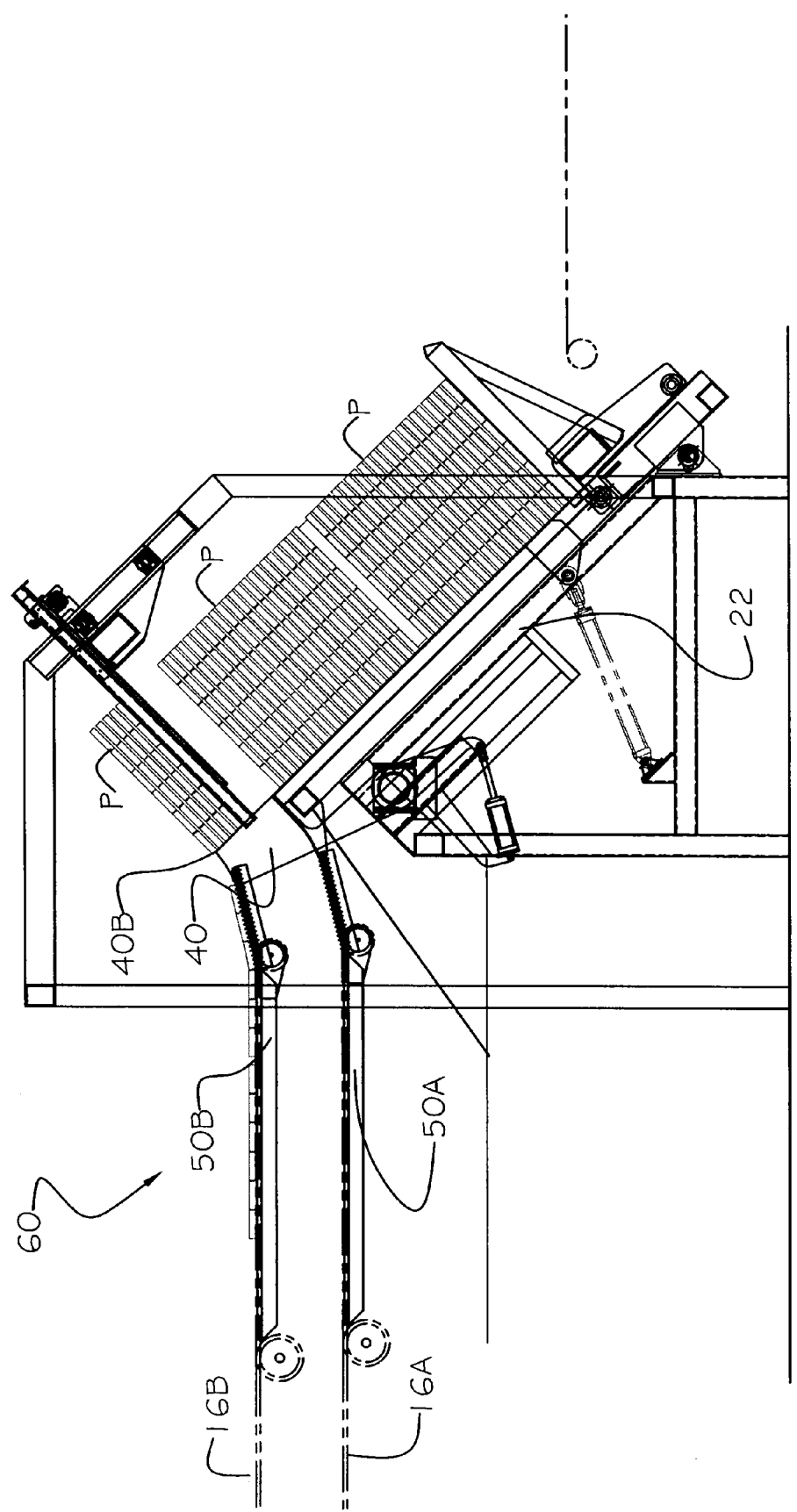

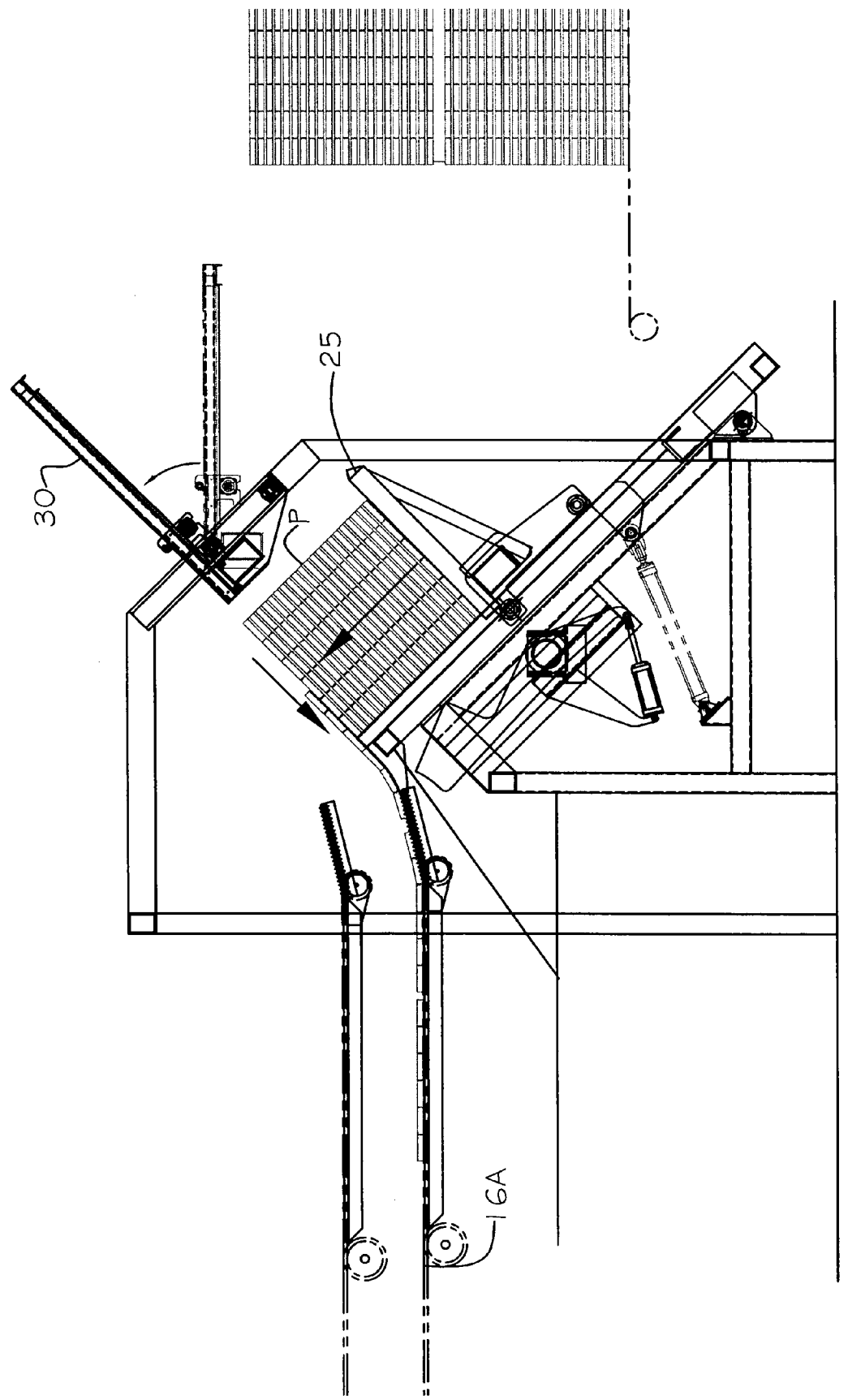

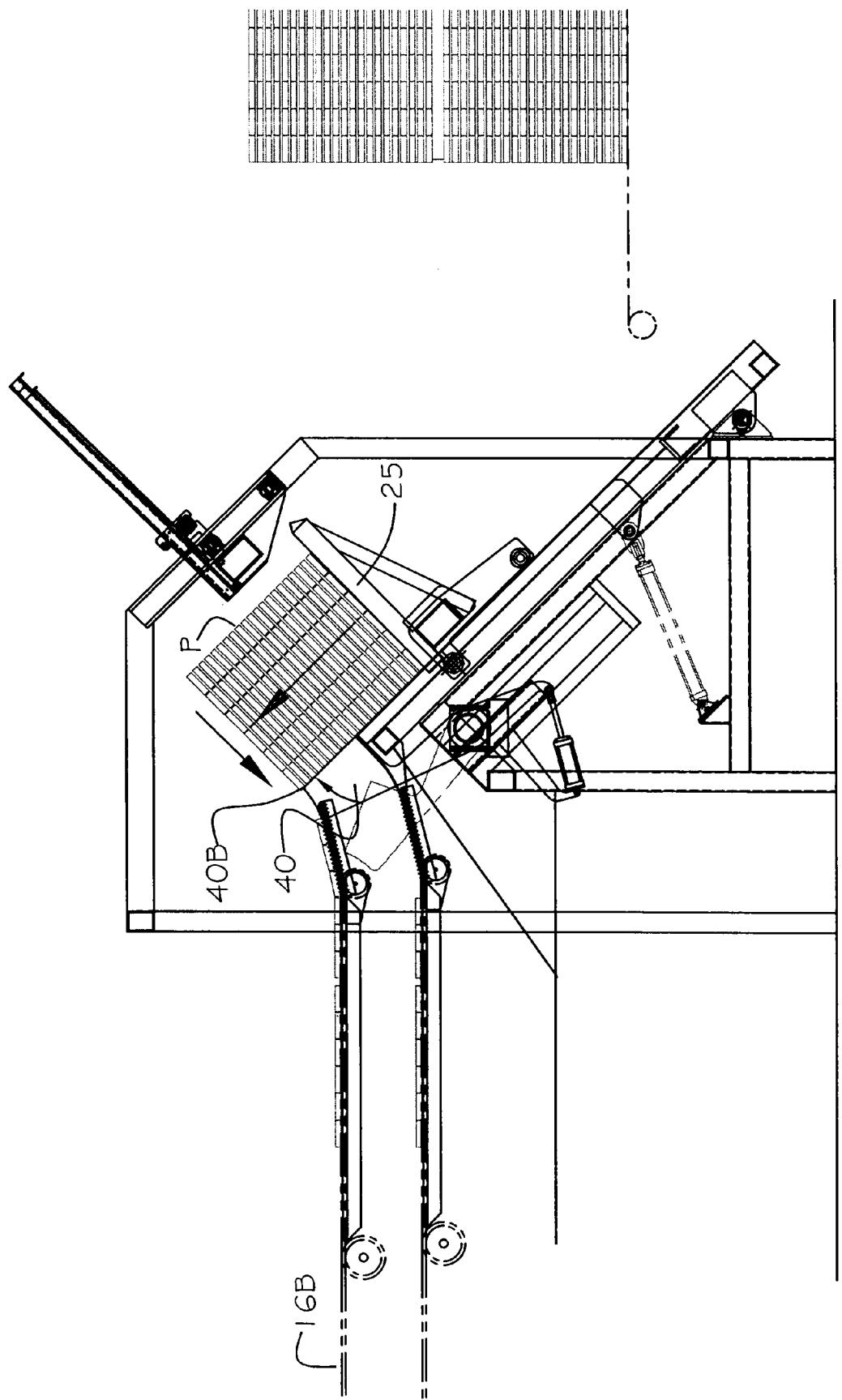

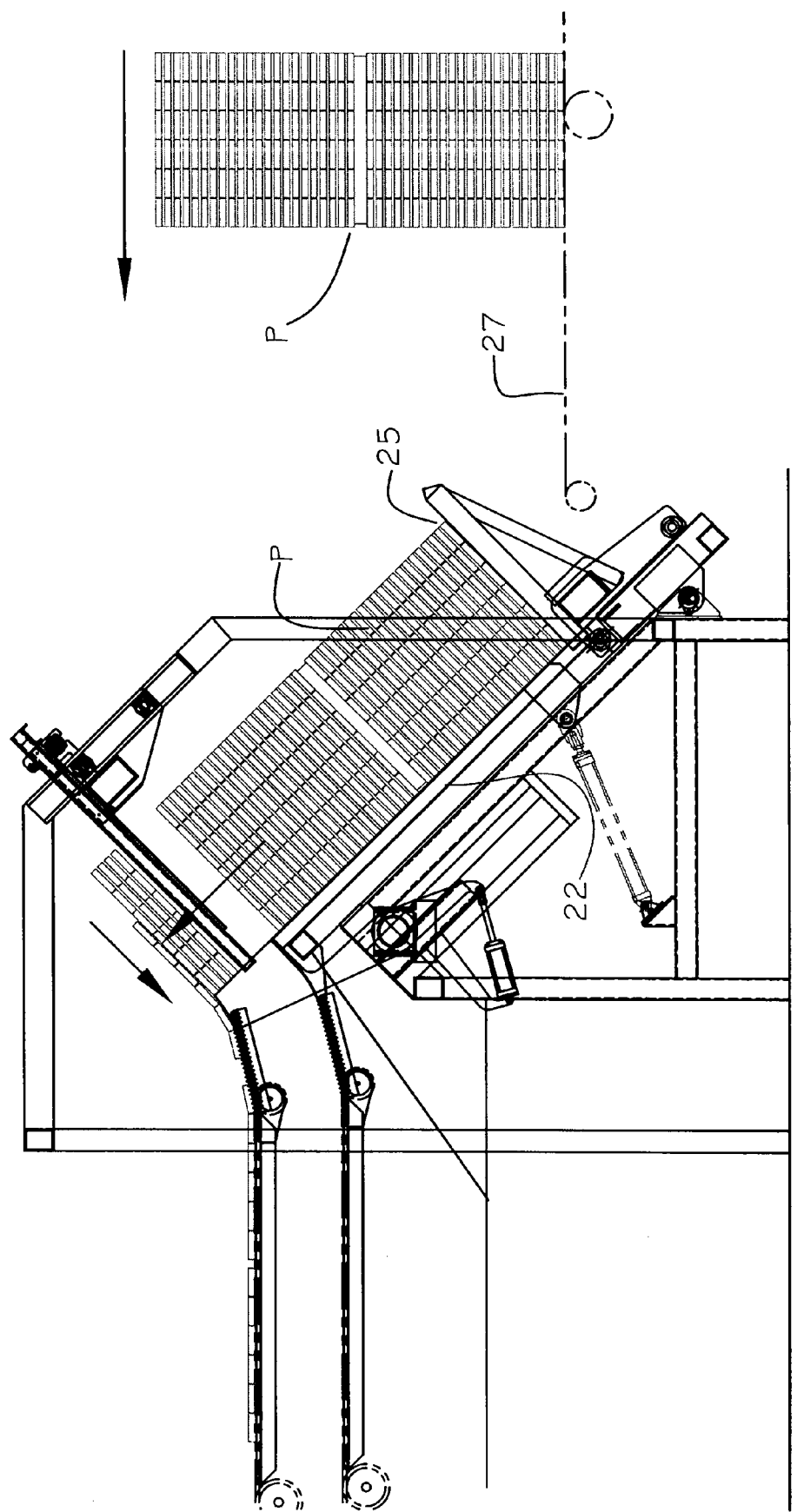

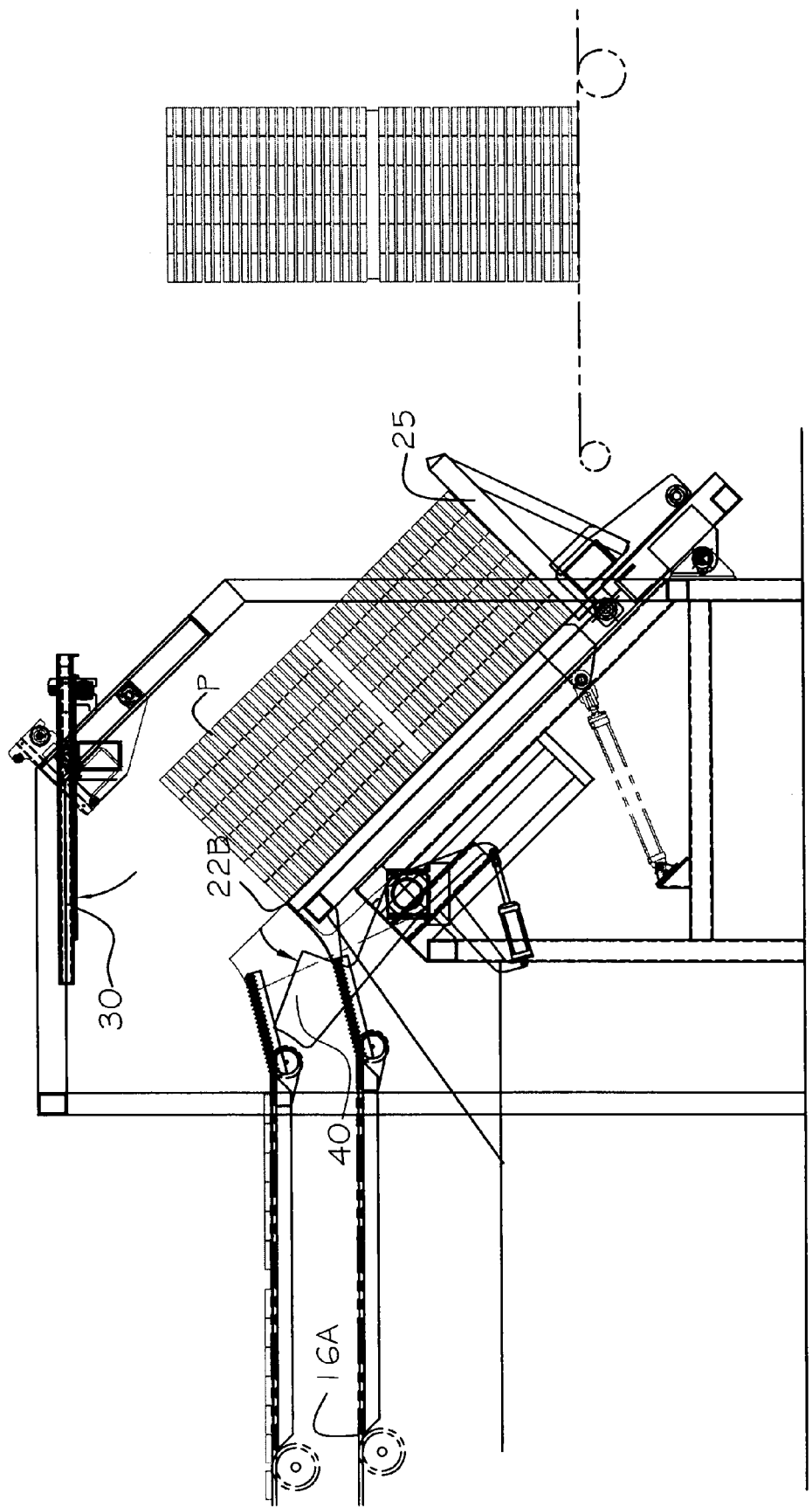

CONTINUOUS BREAKDOWN HOISTS

TECHNICAL FIELD

The invention relates to hoists for breaking down packages of objects such as lumber. The invention has application in sawmills and other operations in which packages or lumber or other elongated objects are handled.

BACKGROUND

Lumber is typically handled in packages. Each package comprises a number of tiers of boards. Some of the tiers may be spaced apart from corresponding adjacent tiers by sticks which extend crosswise to the boards.

A continuous breakdown hoist is used to separate boards from packages of lumber. For example, such a hoist may be used to break a package of lumber into a stream of individual boards that may be fed into a planer in a planer mill. Examples of continuous breakdown hoists are described in:

Jacobsen U.S. Pat. No. 4,640,655
Johnson U.S. Pat. No. 4,838,748 and CA 1318334,
Ritola U.S. Pat. No. 5,249,915 and CA 2089436,
Newnes U.S. Pat. No. 5,879,129 and CA 2230464, and
Hellstrom SE 7501507.3.

Other hoists are described in: SE161631; U.S. Pat. No. 5,795,126; CA2121401; SU906358; SE7405427; U.S. Pat. No. 1,676,957 and U.S. Pat. No. 1,549,149.

The continuous breakdown hoists described above each have a hoist capable of lifting a package of lumber to a discharge location and a secondary hoist, set of accumulator arms, or the like, that can support a package of lumber (or partial package of lumber) while another package of lumber is loaded onto the hoist. This permits a substantially continuous discharge of boards to downstream equipment such as a planer.

The present inventors have determined that the continuous breakdown hoists described above suffer to at least some degree from some or all of the following disadvantages:

The secondary hoist must be located in the feed path that delivers lumber to a planer or other device. There is no way to bypass use of the secondary hoist. Therefore, the secondary hoist must be used for all packages, whether it is truly needed or not.

The secondary hoists are complex mechanically, and subject to mechanical failure. Since they cannot be bypassed, failure of a secondary hoist can cause an entire plant to be shut down at great expense.

Debris such as sticks and snow spilling from lumber packages can interfere with the operation of the continuous breakdown hoist mechanisms.

Some of the designs cannot be retrofitted to an existing conventional tilt hoist.

Designs that provide arms that are located underneath the package, impose further constraints that impair the overall functionality of the machine—i.e. such designs typically provide slots for the arms to extend and index through. Such slots make the machine prone to jamming as a result of debris entering the slots.

In designs that have bottom arms that support a package, the need to lower and retract the bottom arms before raising the main hoist to spill can increase the over-all cycle time.

To maintain the most profitable operation, it is generally desirable to run a planer mill or other lumber-processing operation at its maximum throughput. The rate at which a planer mill can receive lumber typically depends upon the width and length of the lumber being processed. This rate is often limited by the power available at the cutting heads. Therefore, wider material is typically processed at a reduced linear rate while narrower material can be processed at an increased rate. The capacity of a planer mill may also be limited by a rate at which downstream equipment can receive and handle individual boards. Therefore, the rate at which short wide material can be processed may be constrained by the rate at which the material can be processed by a breakdown hoist. By contrast, the rate at which long wide material can be processed may be constrained by the rate at which that material can be processed by a planer.

The performance required of a breakdown hoist can be reduced by providing surge capacity between the hoist and a planer or other downstream machine. However, increasing the surge capacity takes up space and can cost more to install and operate.

There remains a need for reliable and cost-effective continuous breakdown hoists.

SUMMARY OF THE INVENTION

This invention has a number of aspects that may be combined or applied individually.

One aspect of the invention provides a breakdown hoist for breaking down packages comprising multiple tiers of lumber. The breakdown hoist comprises a main frame having a top edge and a face, a main lift arranged to lift packages along the face of the main frame, an extension frame and a secondary hoist. The extension frame has a face and is moveable between an extended position wherein the face of the extension frame extends past the top edge of the main frame and a retracted position wherein lumber can spill over the top edge of the main frame. The secondary hoist has a lifting support that is extendable to receive and support a package lifted by the main hoist and retractable. The secondary hoist is adapted to lift a package to a secondary top edge above the top edge of the main frame.

Further aspects of the invention and features of specific embodiments of the invention are described below.

BRIEF DESCRIPTION OF THE DRAWINGS

The accompanying drawings illustrate non-limiting embodiments of the invention.

In FIG. 2A the breakdown hoist is configured to bypass a secondary hoist. If FIG. 2B the breakdown hoist is configured to use the secondary hoist.

FIGS. 3A through 3H illustrate steps in the operation of the breakdown hoist of FIGS. 2A and 2B.

FIGS. 4A and 4B are partially schematic diagrams illustrating a continuous breakdown hoist according to another embodiment of the invention.

FIGS. 5A to 5I illustrate steps in the operation of the breakdown hoist of FIGS. 4A and 4B.

LIST OF REFERENCE CHARACTERS

| L | piece of lumber |
|---|---|
| P | package of lumber |
| 10 | planer mill |
| 12 | breakdown hoist (FIG. 1) |
| 14 | planer |
| 16 | conveyor |
| 16A | lower conveyor |
| 16B | upper conveyor |
| 20 | breakdown hoist (FIGS. 2A to 3H) |
| 22 | tilting frame |
| 22A | face |
| 22B | top edge |
| 23 | pivot for frame 22 |
| 24 | actuator for tilting frame 22 |
| 25 | main lifting arms |
| 27 | conveyor |
| 30 | secondary lifting arms |
| 32 | track for secondary lifting arms |
| 33 | arrow |
| 34 | arrow |
| 35 | arrow |
| 40 | extension frame |
| 40A | face |
| 40B | top edge |
| 42 | carriage |
| 43 | actuator |
| 44 | pivot for extension frame |
| 50 | movable conveyor section |
| 50A | end of lower conveyor |
| 50B | end of upper conveyor |
| 52 | pivot |
| 54 | actuator for movable conveyor section |
| 60 | breakdown hoist (FIG. 6A) |
| 72 | secondary frame |
| 72A | face |
| 72B | top edge |
| 72C | bottom edge |
| 73 | gap |
| 80 | controller |
| 82A to 82F | actuators |

DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

Figure 1:
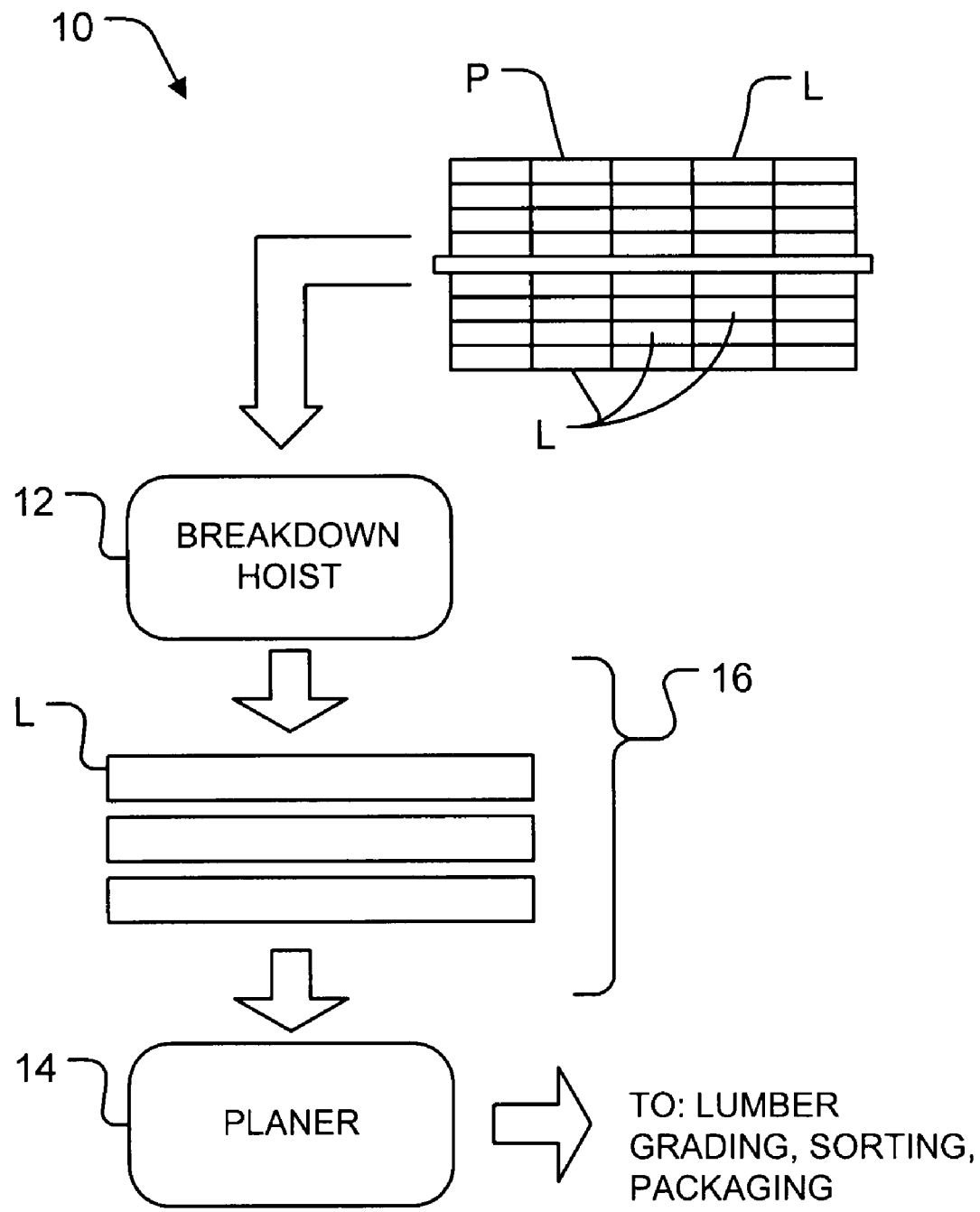
FIG. 1 is a schematic diagram showing major components of a planer mill in which apparatus according to the invention could be applied.

FIG. 1 shows schematically the overall arrangement of a planer mill 10. Packages P of lumber are broken down into individual pieces L of lumber by a breakdown hoist 12. Individual pieces L of lumber are carried from breakdown hoist 12 to a planer 14 by an infeed conveyor 16. Ideally, breakdown hoist 12 can break down packages P at a rate sufficient to keep planer 14 operating continuously. There should be no interruption in the operation of breakdown hoist 12 that is long enough to cause planer 14 to be required to wait for a next piece of lumber to plane.

Infeed conveyor 16 can hold enough lumber for planer 14 to run for a short time. The length of time that planer 14 can run on the lumber on infeed conveyor 16 depends upon the length of infeed conveyor 16 and the dimensions of the lumber. This is illustrated by the following example. Suppose that planer 14 is capable of planing 2×12 lumber at 2000 ft/min, and 2×4 lumber at 3000 ft/min, with a maximum piece rate of 140 pcs/min (due to limitations in the downstream equipment), while processing boards having lengths between 8 ft and 20 ft. In this example, 20 ft long 2×12 boards would be processed at a rate of (2000/20)=100 pcs/min whereas 2×12 boards 14 ft long or shorter would be processed at 140 pcs/min. The maximum piece rate of 140 pcs/min constrains the 2×4 production in all cases.

At 140 pcs/min, the consumption rate of the material coming off of breakdown hoist 12 is approximately 140 ft/min (140 pcs/min×1 ft/pc) for the 2×12 s, and 46 ft/min for the 2×4 s. Therefore, if the length of infeed conveyor 16 upstream from planer 14 is 46 ft then infeed conveyor 16 can contain 1 minute of capacity for 2×4 boards, and only 20 seconds of capacity for short 2×12 boards.

Figure 2A:
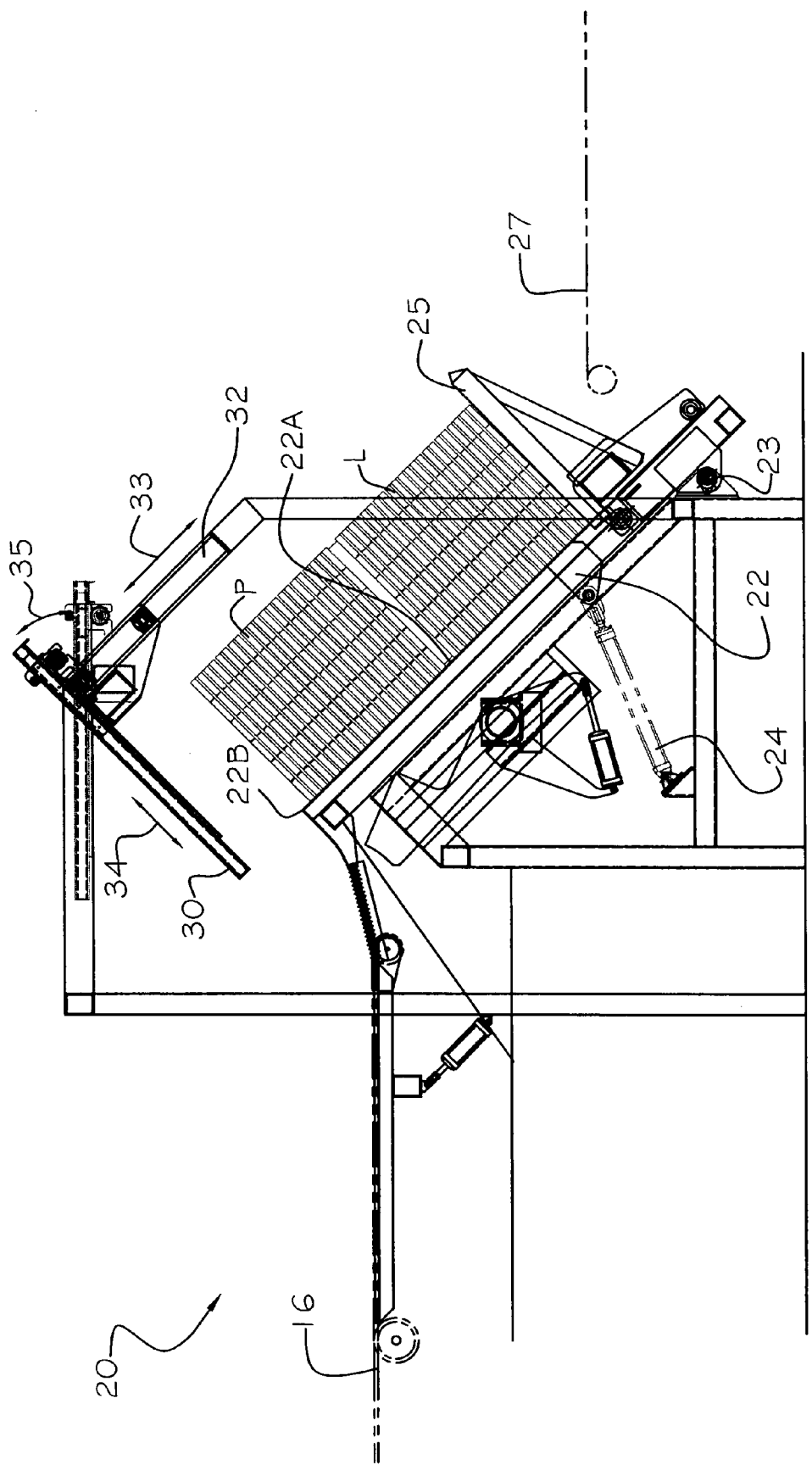
FIGS. 2A and 2B are partially schematic diagrams illustrating a continuous breakdown hoist according to an embodiment of the invention.
Figure 2B:
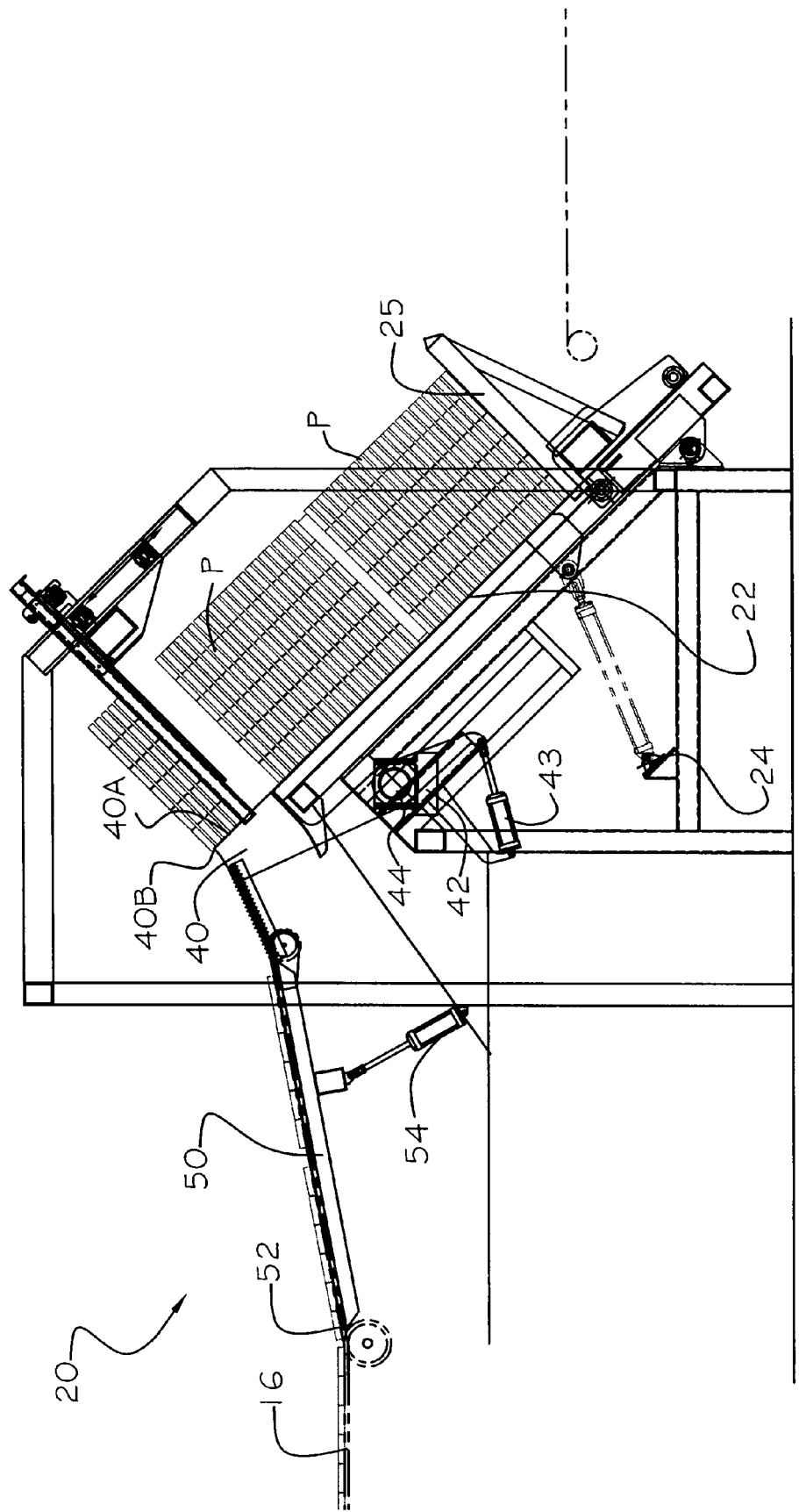

FIGS. 2A and 2B show a breakdown hoist 20 according to an embodiment of the invention. Breakdown hoist 20 comprises a tilting frame 22 and main lifting arms 25. Frame 22 is pivoted at pivot 23 so that it can be moved between an upright configuration for receiving packages of lumber and a tilted configuration, as shown, for discharging lumber from packages onto infeed conveyor 16. In the illustrated embodiment, a linear actuator 24, such as a hydraulic cylinder is connected to move frame 22 between its upright and tilted positions.

Packages P of lumber L are supported from below by main lifting arms 25. Main lifting arms 25 can be moved along frame 22 to slide packages of lumber L along a face 22A of frame 22. When a tier of lumber reaches top edge 22B of frame 22 the tier of lumber can slide over top edge 22B onto infeed conveyor 16.

Main lifting arms 25 may be lifted until they are at least even with top edge 22B so that all of the lumber being carried on main lifting arms 25 can be delivered onto infeed conveyor 16.

Breakdown hoist 20 has a set of secondary lifting arms 30 that are movable along a track 32 as indicated by arrows 33. Track 32 extends substantially parallel to face 22A. Secondary lifting arms 30 are retractable and extendable as indicated by arrow 34. Secondary lifting arms 30 are optionally pivotable as indicated by arrow 35. Making secondary hoist arms 30 pivotable can reduce the overall height of breakdown hoist 20 so that breakdown hoist 20 can be installed in a shorter building than would otherwise be required.

An extension frame 40 is movable between a position wherein a face 40A of extension frame 40 extends face 22A (see FIG. 2B) and a position wherein extension frame 40 is out of the way (see FIG. 2A). In the illustrated embodiment, extension frame 40 is mounted pivotally on a carriage 42. Carriage 42 is movable toward or away from top edge 22B of frame 22 by means of a suitable actuator. With carriage 42 positioned toward top edge 22B of frame 22 extension frame 40 can be pivoted into a position wherein face 40A forms an extension of face 22A as shown in FIG. 2B. An actuator 43 is provided to pivot extension frame 40 about a pivot 44 carried on carriage 42.

When extension frame 40 is in position to extend frame 22, as shown in FIG. 2B, lumber can spill over top edge 40B of extension frame 40. As described below, secondary lifting arms 30 can support one package of lumber (or a portion thereof) while spilling the lumber over the tope edge 40B of extension frame 40 while frame 22 is tilted into its upright position to receive a new package of lumber on main lifting arms 25.

The end of conveyor 16 adjacent to breakdown hoist 20 is movable between a lowered position (see FIG. 2A) in which it is positioned to receive lumber spilling over tope edge 22B of frame 22 and an upper position (see FIG. 2B) in which it is positioned to receive lumber spilling over top edge 40B of extension frame 40. In the illustrated embodiment, a section 50 of conveyor 16 is pivoted at a pivot 52 so that it can be raised or lowered by an actuator 54.

Breakdown hoist 20 can be operated in the configuration shown in FIG. 2A without using secondary lifting arms 30, if desired. In this mode, breakdown hoist 20 ceases discharging lumber while main lifting arms 25 are reloaded with lumber.

Figure 3A:
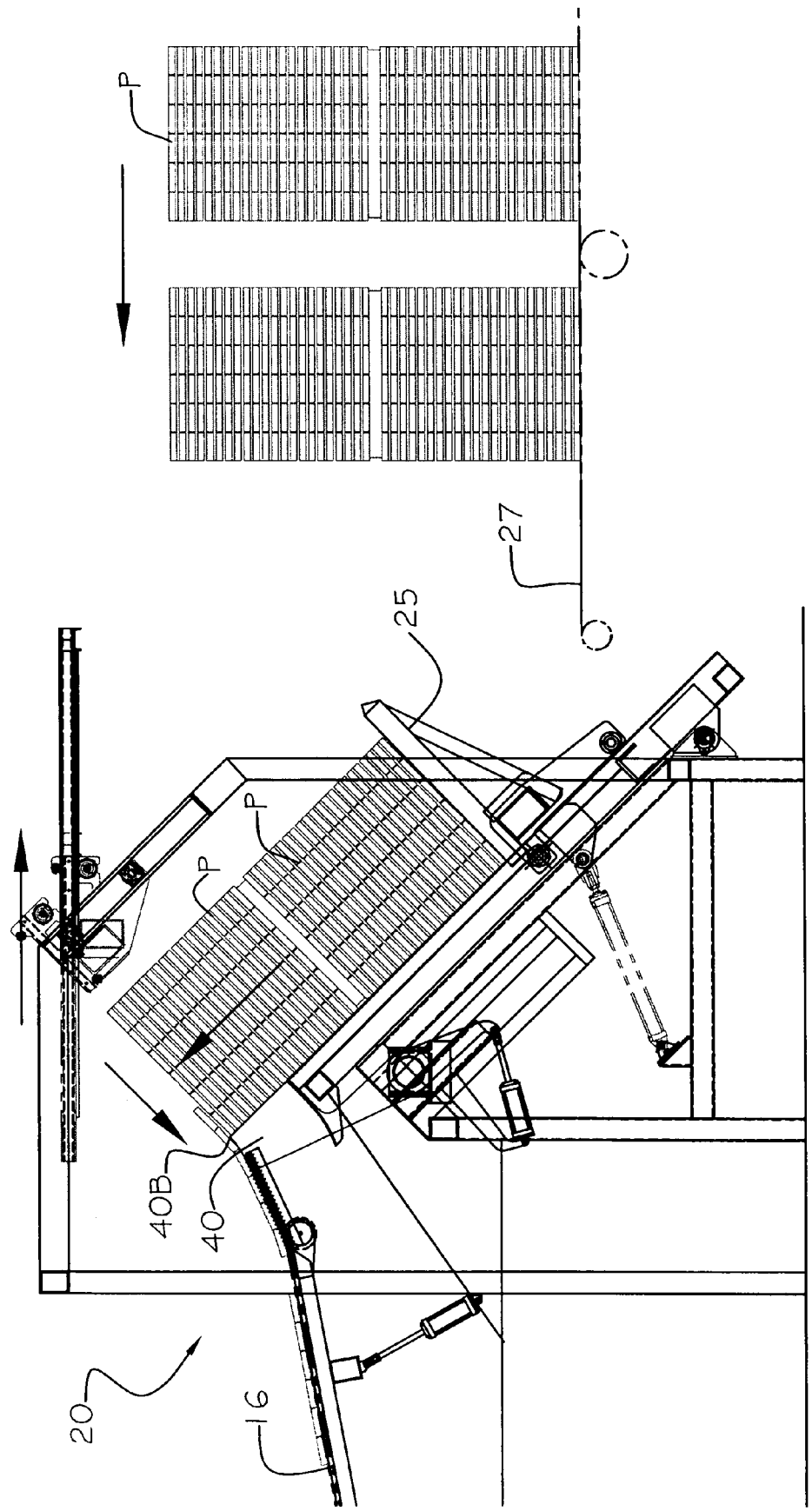

FIGS. 3A to 3H show stages in the operation of breakdown hoist 20 when configured as shown in FIG. 2B to use secondary lifting arms 30. In FIG. 3A, packages P are supported on main hoist arms 25 and lumber is being spilled over top edge 40B of extension frame 40 onto conveyor 16. After each tier of lumber has been spilled onto conveyor 16, main hoist arms 25 are raised sufficiently to allow the next tier of lumber to spill over top edge 40B. Also in FIG. 3A, secondary lifting arms 30 are being retracted and more packages P are brought into a loading position adjacent breakdown hoist 20 on conveyor 27.

Figure 3B:
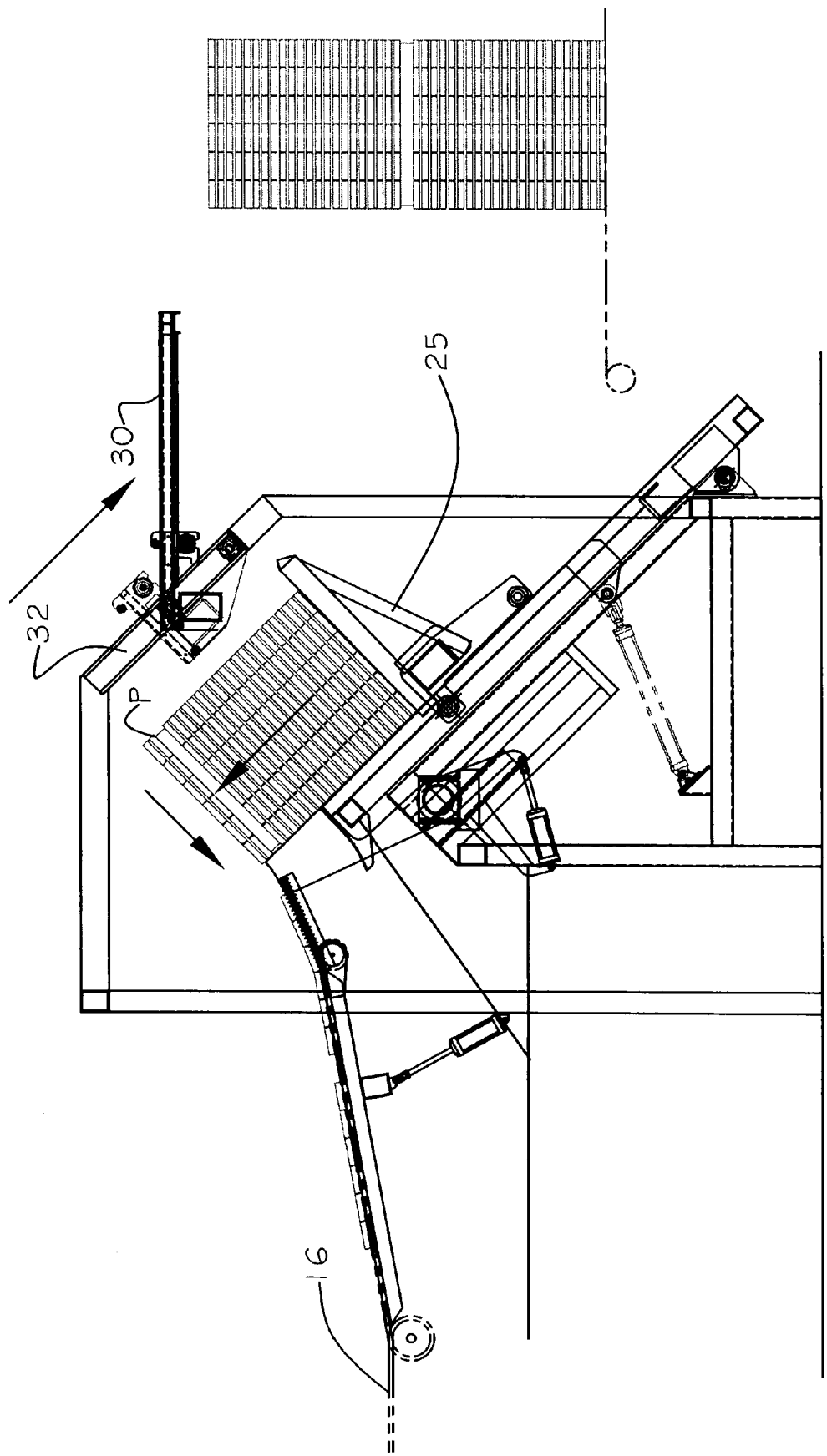

In FIG. 3B, main lifting arms 25 are controlled so that lumber continues to spill onto conveyor 16 while secondary lifting arms 30 are lowered along track 32.

Figure 3C:
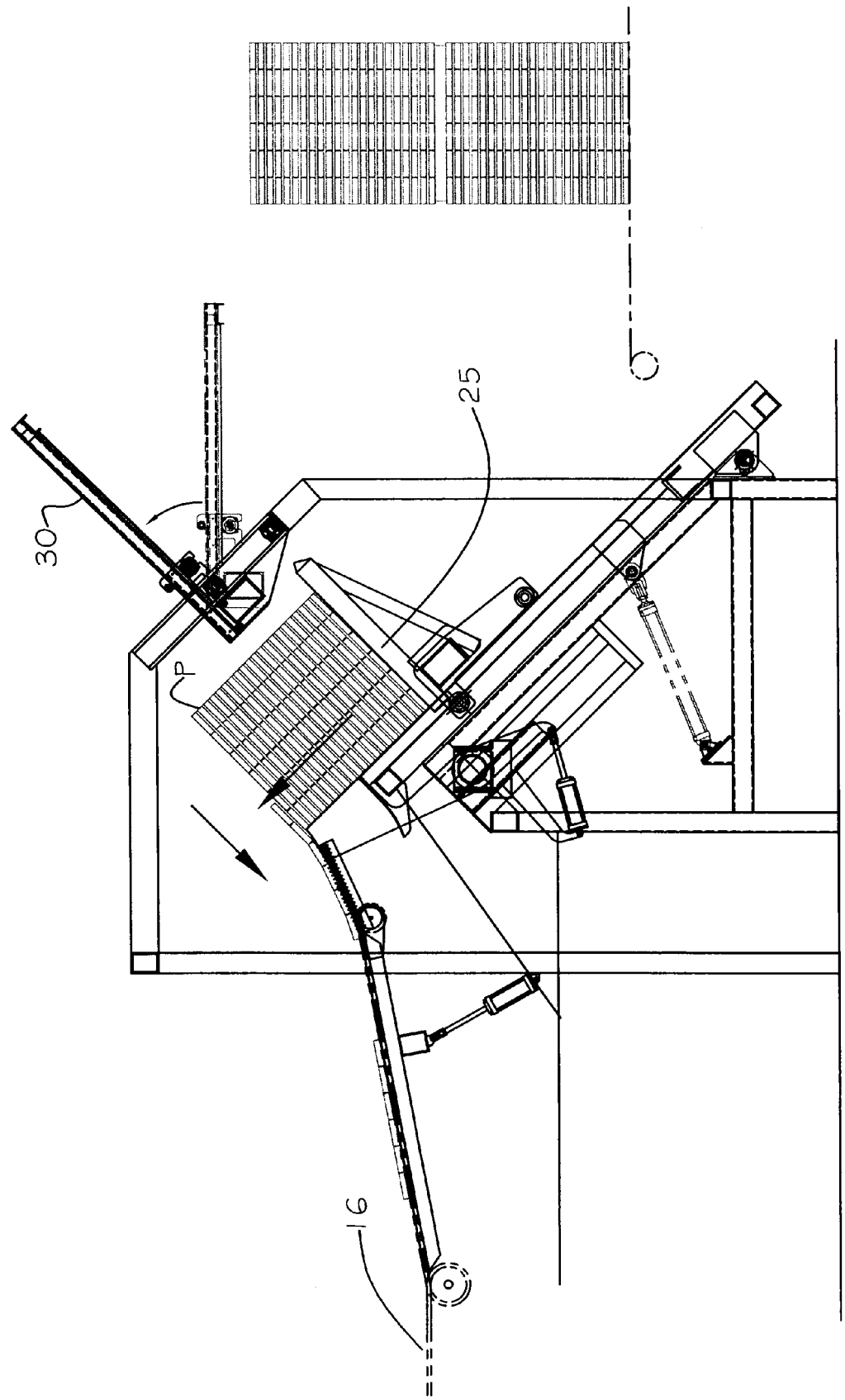

In FIG. 3C, main lifting arms 25 are controlled so that lumber continues to spill onto conveyor 16 while secondary lifting arms 30 are being rotated into a position where they are ready for use, parallel to the tiers of packages P.

Figure 3D:
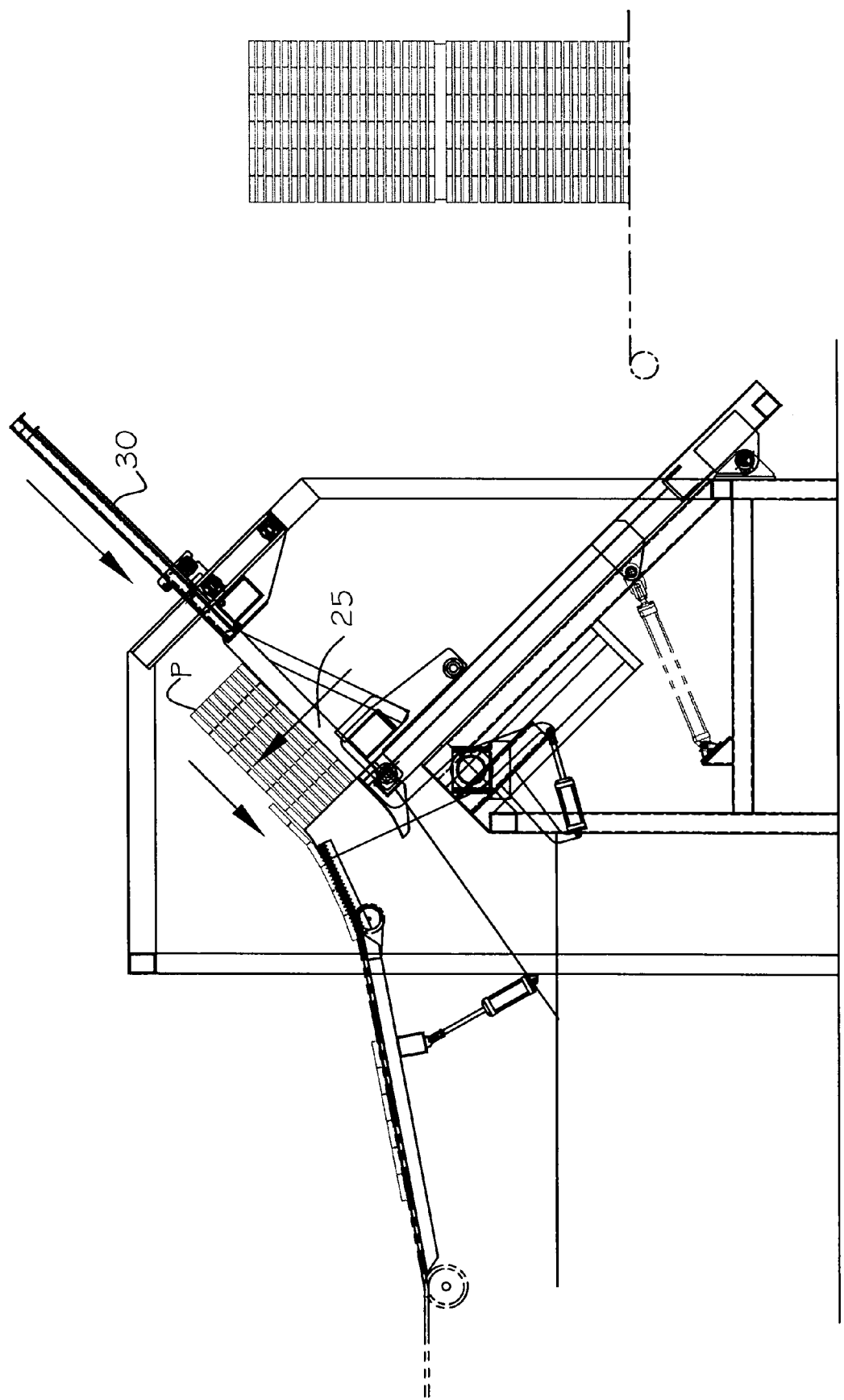

In FIG. 3D, main lifting arms 25 have lifted package P to a hand-off position in which the lower surface of package P is above secondary lifting arms 30. Secondary lifting arms 30 can be extended so that they lie below package P.

Figure 3E:
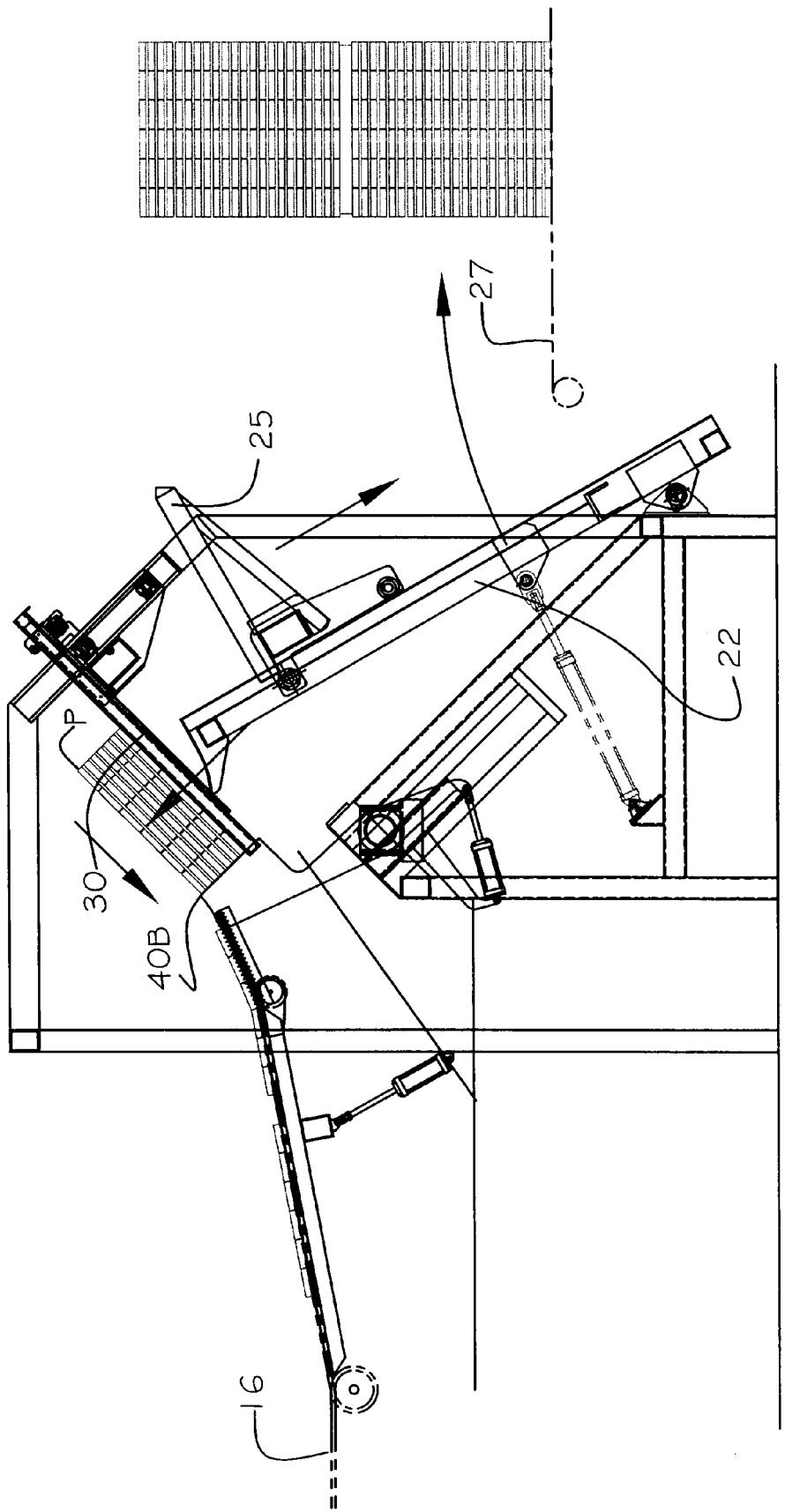

In FIG. 3E, secondary lifting arms 30 have been fully extended and are supporting package P. As each tier of lumber spills over edge 40B, secondary lifting arms 30 lift package P farther up to allow the next tier of lumber to spill over top edge 40B. Frame 22 is being pivoted toward its upright position and main lifting arms 25 are being lowered to receive one or more packages of lumber from conveyor 27.

In FIG. 3F, secondary lifting arms 30 are controlled so that lumber continues to spill onto conveyor 16. Frame 22 has reached its loading position, main lifting arms 25 have been lowered and conveyor 27 is being operated to load packages P onto main lifting arms 25.

Figure 3G:
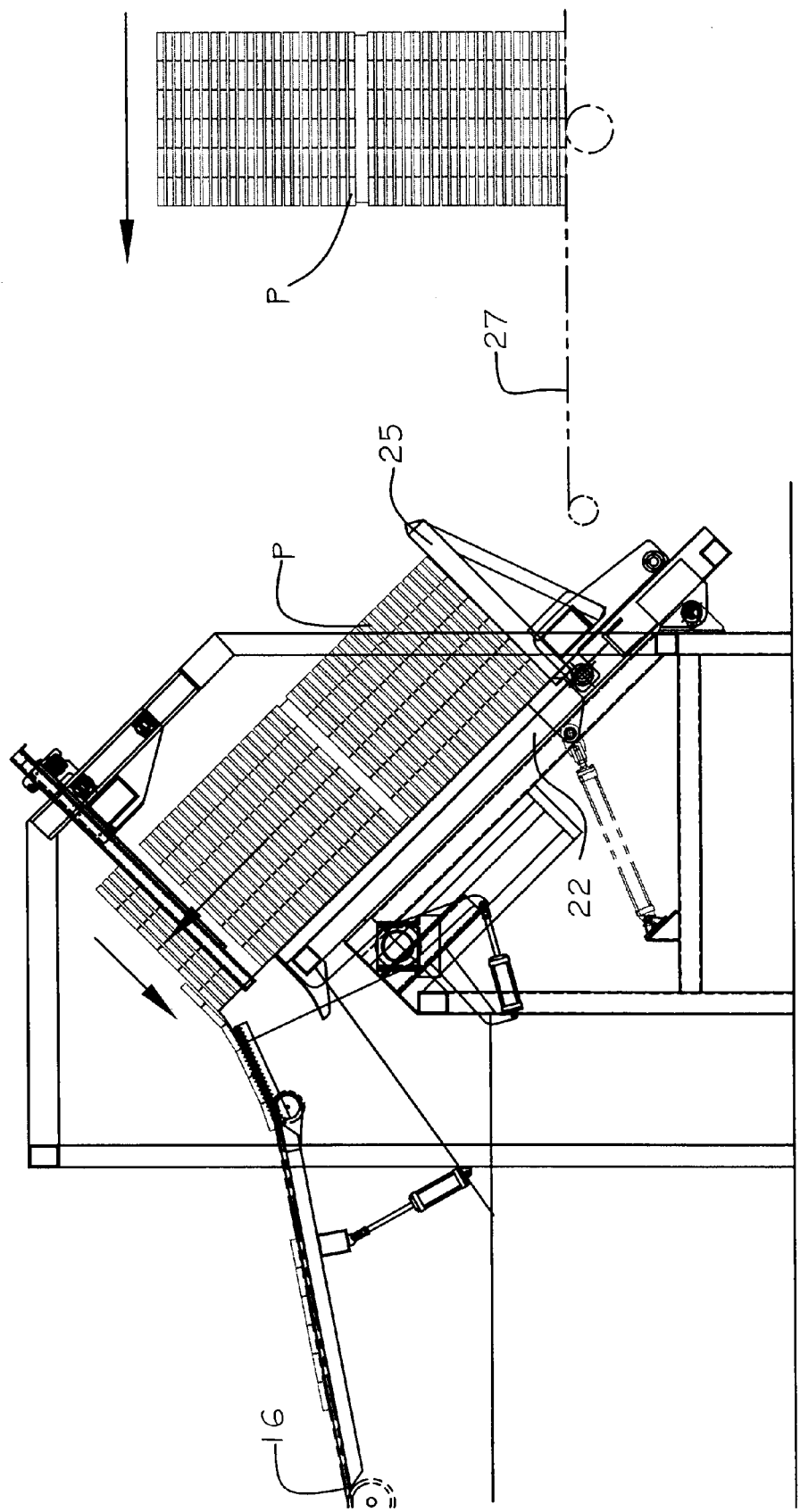

In FIG. 3G, frame 22 has been moved to its tilted position, main lifting arms 25 are beginning to lift the newly-loaded packages P and more packages P are being brought into position for loading on conveyor 27.

In FIG. 3H the last tier of lumber has been discharged from secondary lifting arms 30 and secondary lifting arms 30 are being pivoted out of the way. Main lifting arms 25 complete lifting packages P to allow the top tier of lumber from packages P to be discharged over top edge 40B.

FIGS. 4A and 4B show a breakdown hoist 60 according to another embodiment. Hoist 60 differs from hoist 20 in the outfeed arrangement. Otherwise, breakdown hoist 60 can be the same as breakdown hoist 20. The same reference numerals are used to indicate certain parts of breakdown hoist 60 that are similar to or the same as corresponding parts of the breakdown hoist 20 described above.

Breakdown hoist 60 feeds two conveyors 16A and 16B. Conveyor 16A has an end 50A positioned to receive lumber that spills over top edge 22A of frame 22. Conveyor 16B has an end 50B positioned to receive lumber that spills over top edge 40B of extension frame 40. This design provides increased surge capacity without requiring a commensurate increase in building area. In some embodiments, breakdown hoist 60 may be configured to allow lumber to be discharged simultaneously onto both of conveyors 16A and 16B during certain phases of operation.

Figure 5A:
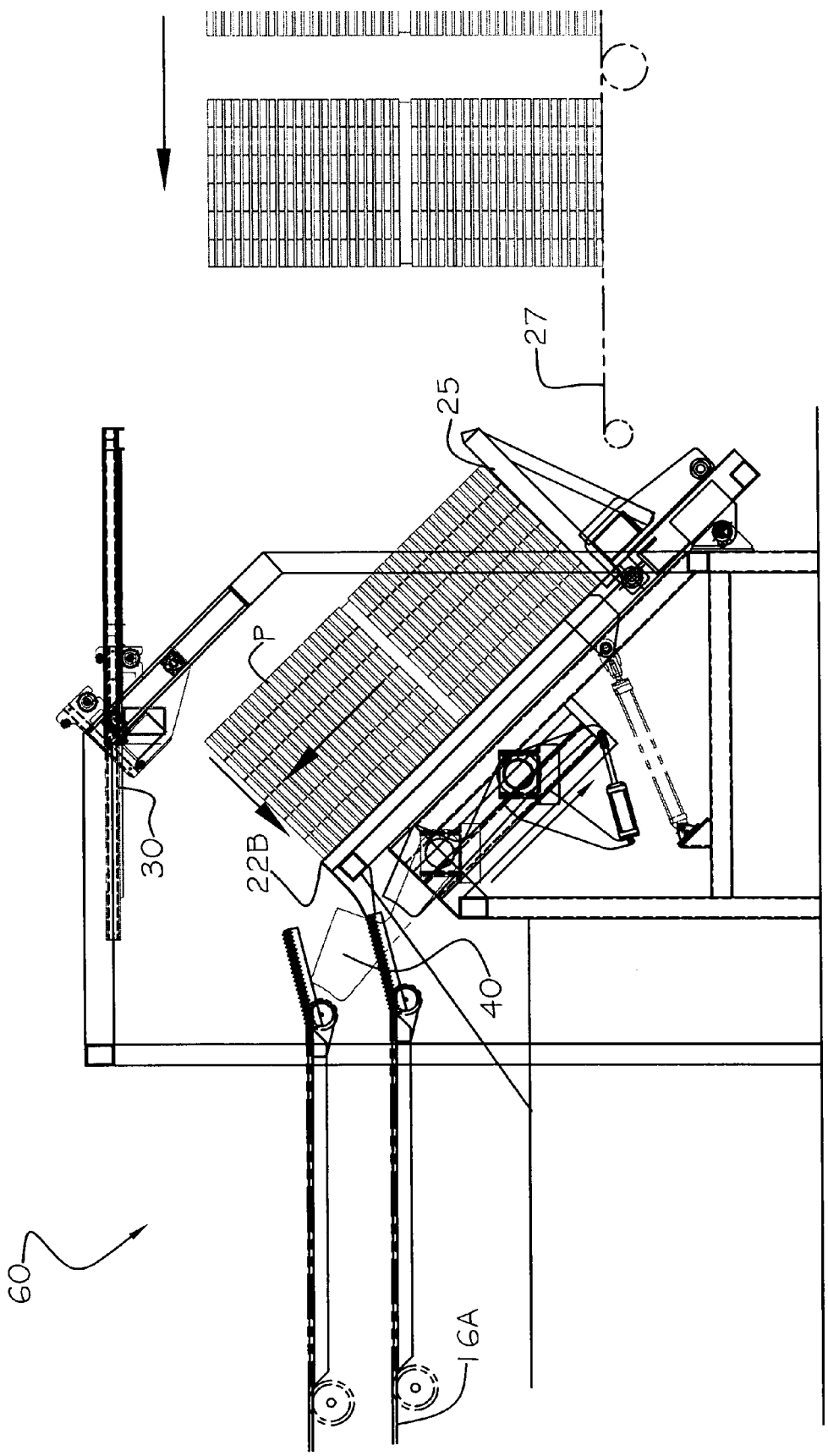

FIGS. 5A to 5H illustrate a mode of operation of breakdown hoist 60. In FIG. 5A, extension frame 40 is being moved to its retracted position, secondary arms 30 have been pivoted and are being retracted, and main lifting arms 25 are lifting packages of lumber so that a tier of lumber can spill over top edge 22B onto lower conveyor 16A. Conveyor 27 is being operated to bring more packages of lumber into position for loading onto breakdown hoist 60.

Figure 5B:
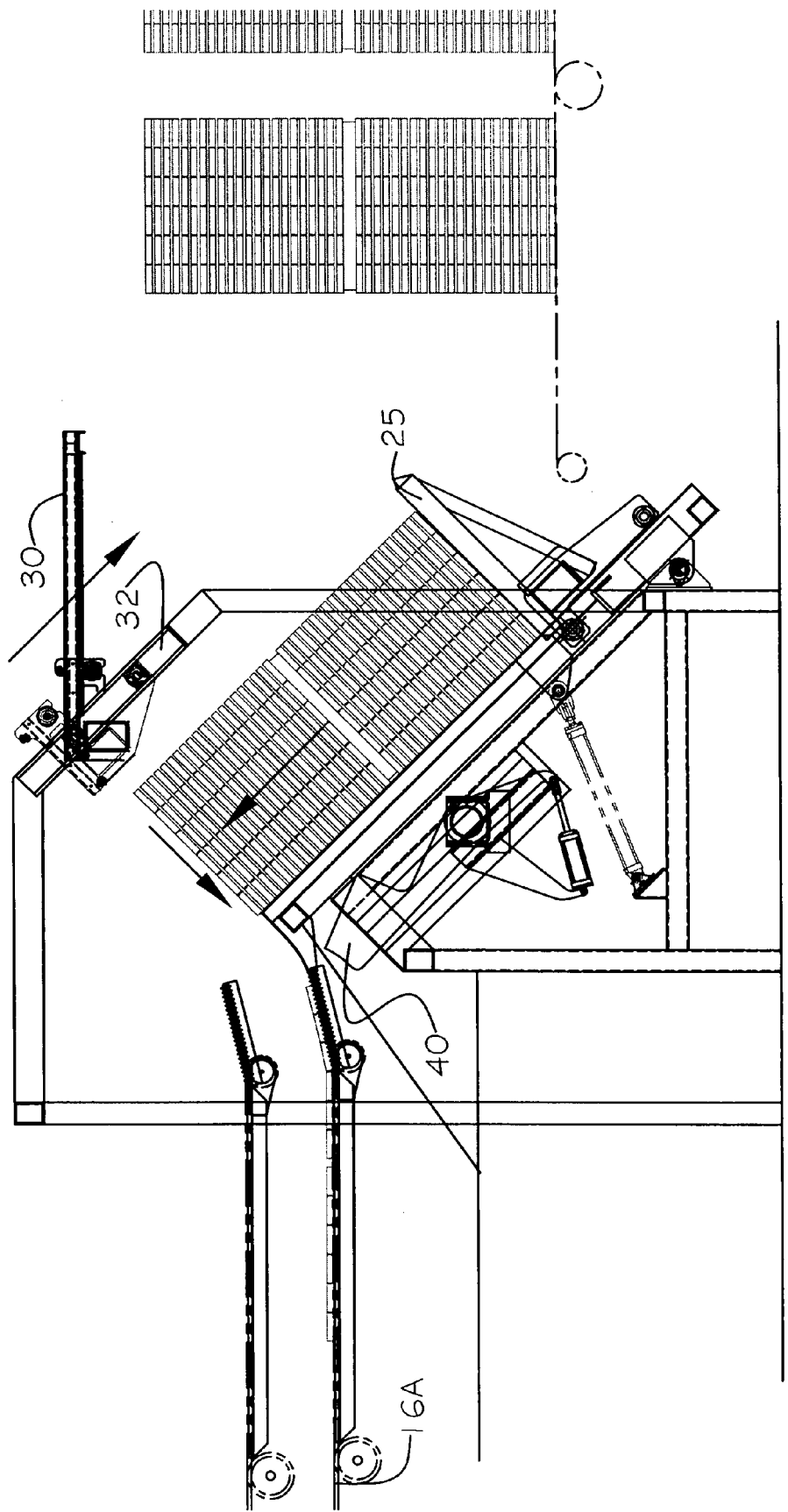

In FIG. 5B, main lifting arms 25 are controlled so that lumber continues to spill onto lower conveyor 16A while secondary lifting arms 30 are lowered along track 32. Extension frame 40 is in its retracted position.

In FIG. 5C, main lifting arms 25 are controlled so that lumber continues to spill onto lower conveyor 16A while secondary lifting arms 30 are being rotated into a position where they are ready for use, parallel to the tiers of packages P.

In FIG. 5D, extension frame 40 has been rotated into position and main lifting arms 25 have been raised so that lumber from the packages P now spills over top edge 40B of extension frame 40 onto upper conveyor 16B. Main lifting arms 25 are controlled so that lumber continues to spill onto upper conveyor 16B.

Figure 5E:
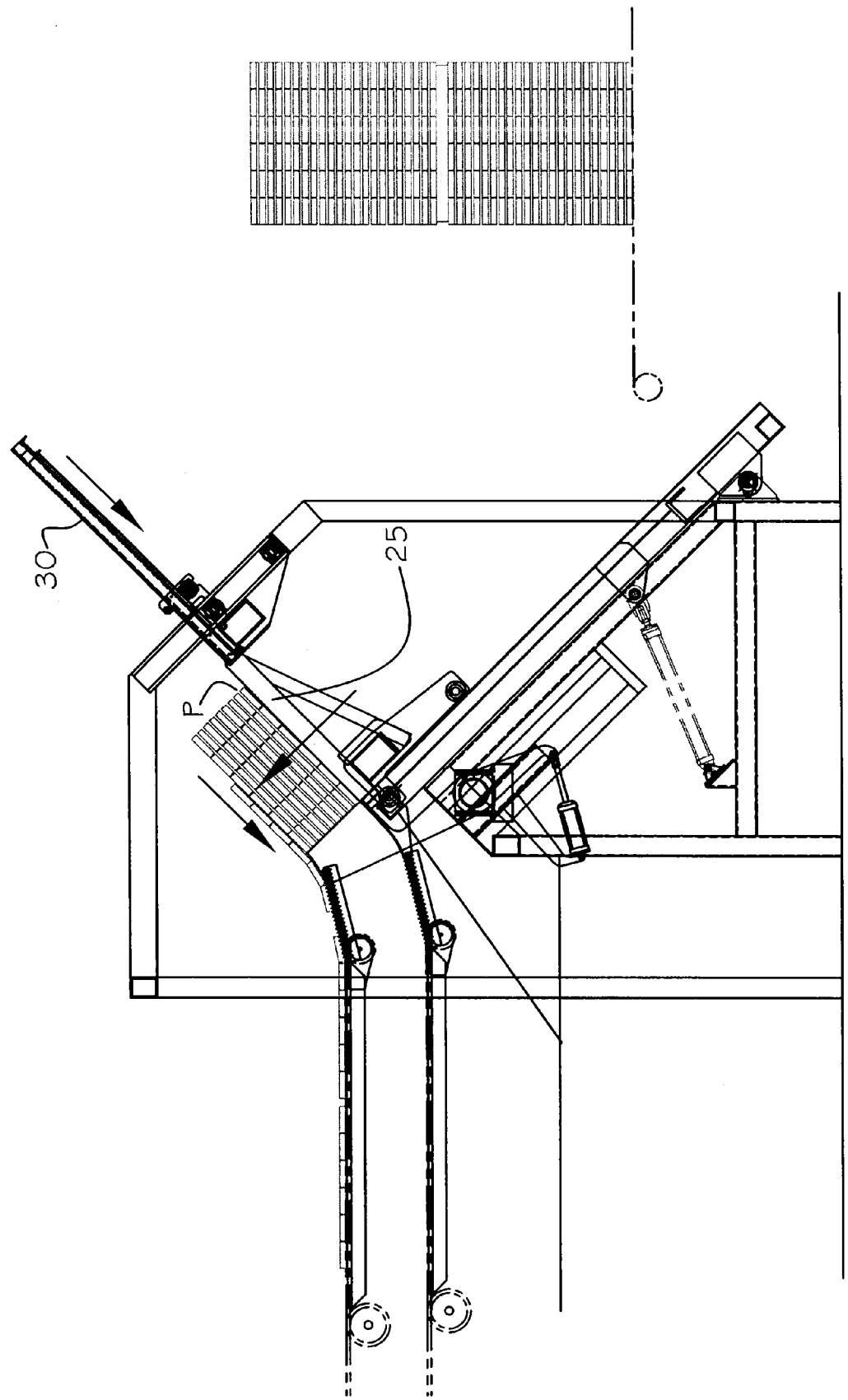

In FIG. 5E main lifting arms 25 have lifted package P to a hand-off position in which the lower surface of package P is above secondary lifting arms 30. Secondary lifting arms 30 can be extended so that they lie below package P.

Figure 5F:
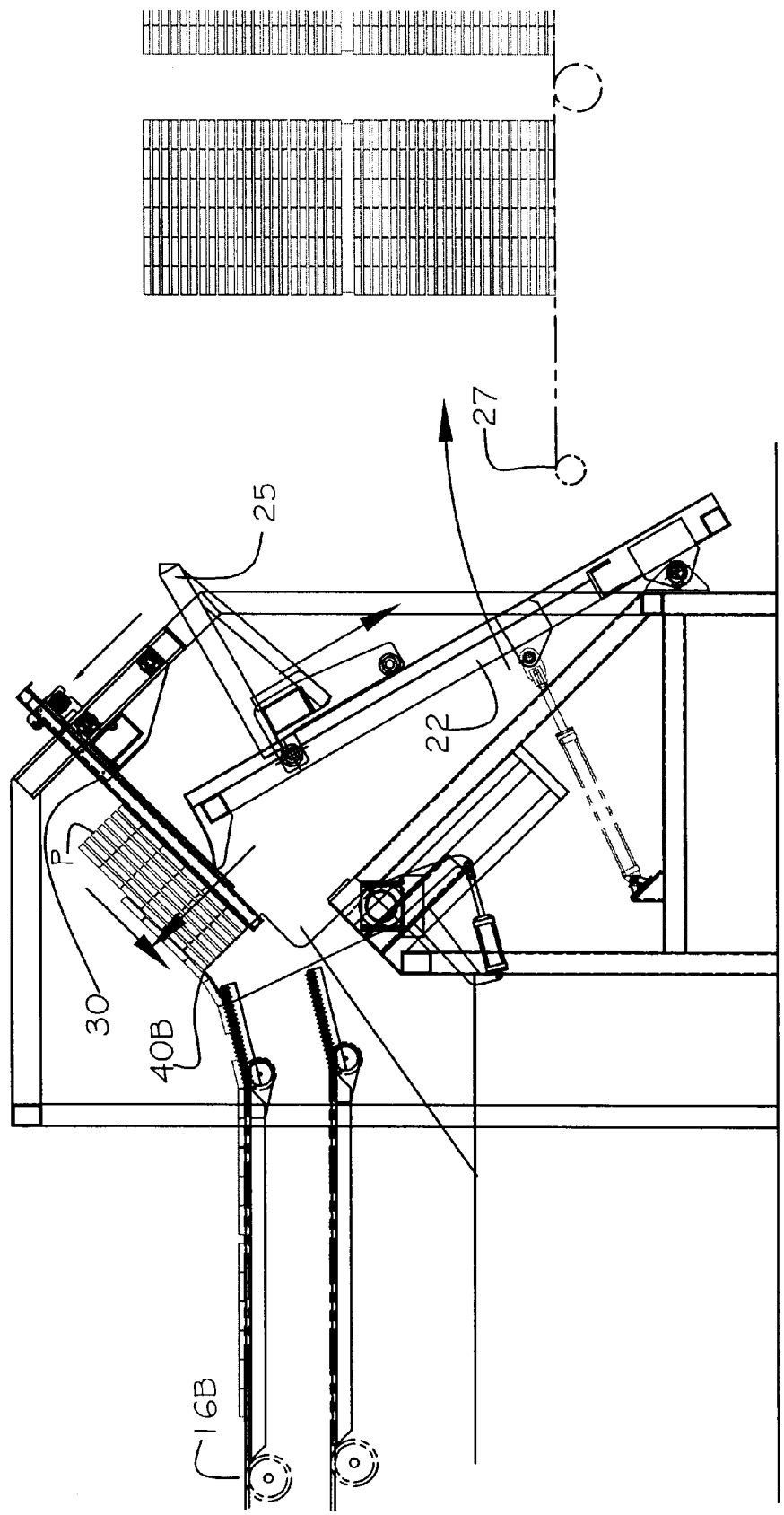

In FIG. 5F, secondary lifting arms 30 have been fully extended and are supporting package P. As each tier of lumber spills over edge 40B, onto upper conveyor 16B, secondary lifting arms 30 lift package P farther up to allow the next tier of lumber to spill over top edge 40B. Frame 22 is being pivoted toward its upright position and main lifting arms 25 are being lowered to receive one or more packages of lumber from conveyor 27.

Figure 5G:
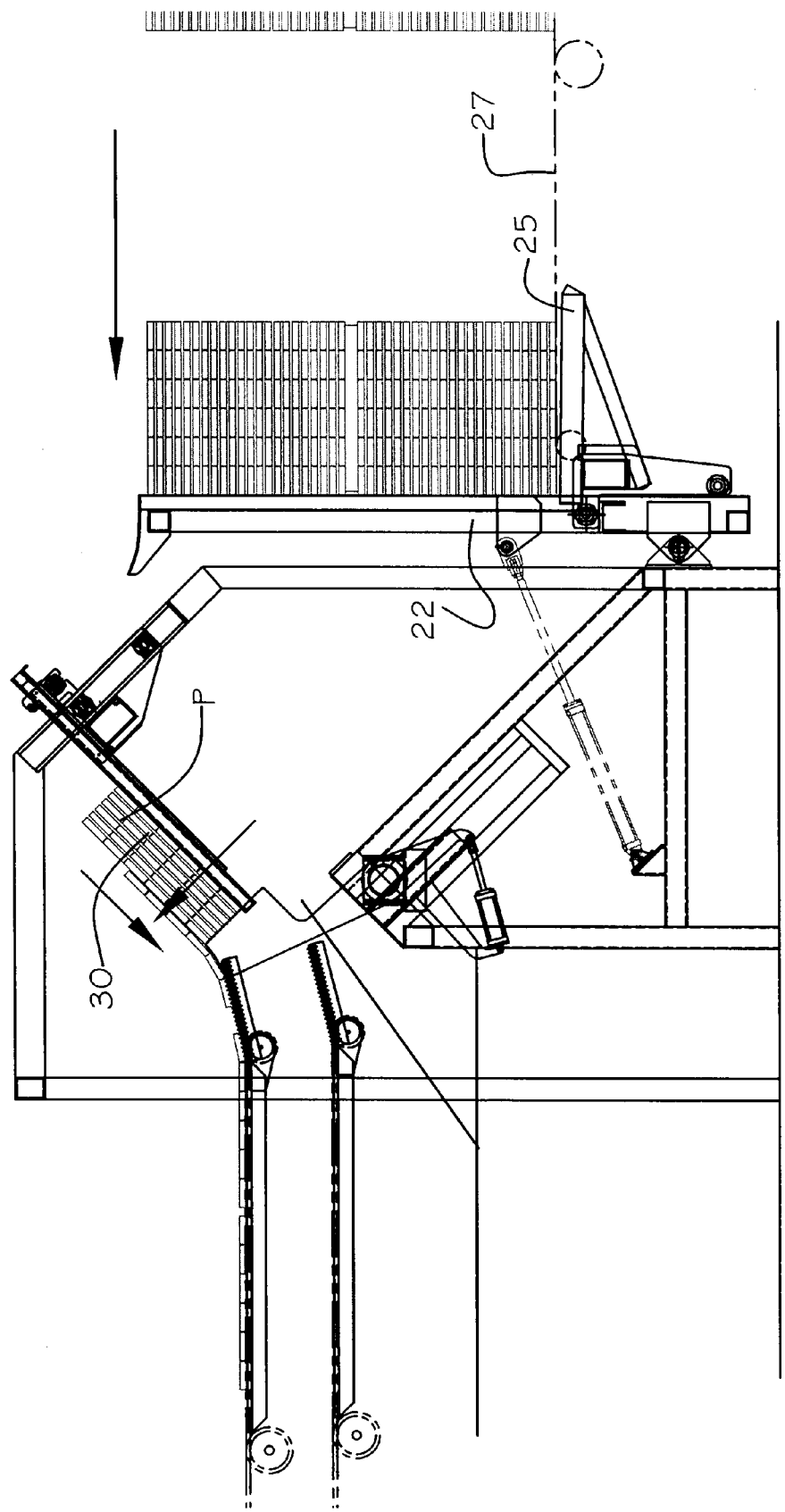

In FIG. 5G, secondary lifting arms 30 are controlled so that lumber continues to spill onto upper conveyor 16B. Frame 22 has reached its loading position, main lifting arms 25 have been lowered and conveyor 27 is being operated to load packages P onto main lifting arms 25.

In FIG. 5H, frame 22 has been moved to its tilted position, main lifting arms 25 are beginning to lift the newly-loaded packages P, and more packages P are being brought into position for loading on conveyor 27.

In FIG. 5I, the last tier of lumber has been discharged from secondary lifting arms 30 and secondary lifting arms 30 are being pivoted out of the way while extension frame 40 is being retracted. Main lifting arms 25 complete lifting packages P to allow the top tier of lumber from packages P to be discharged over edge 22B onto lower conveyor 16A.

It can be appreciated that hoist 60 could be operated to deliver lumber only to top conveyor 16B or only to bottom conveyor 16A.

FIGS. 6A to 6E show schematically a breakdown hoist 70 according to another embodiment which is similar to breakdown hoist 60 except that it has a secondary frame 72 having a face 72A capable of supporting lumber while extension frame 40 is retracted. Secondary frame 72 has a top edge 72B. Lumber can spill over top edge 72B onto top conveyor 16B. Secondary frame 72 is spaced above tilting frame 22 such that there is a gap 73 between the lowermost edge 72C of secondary frame 72 and top edge 22B of frame 22.

Figure 6A:
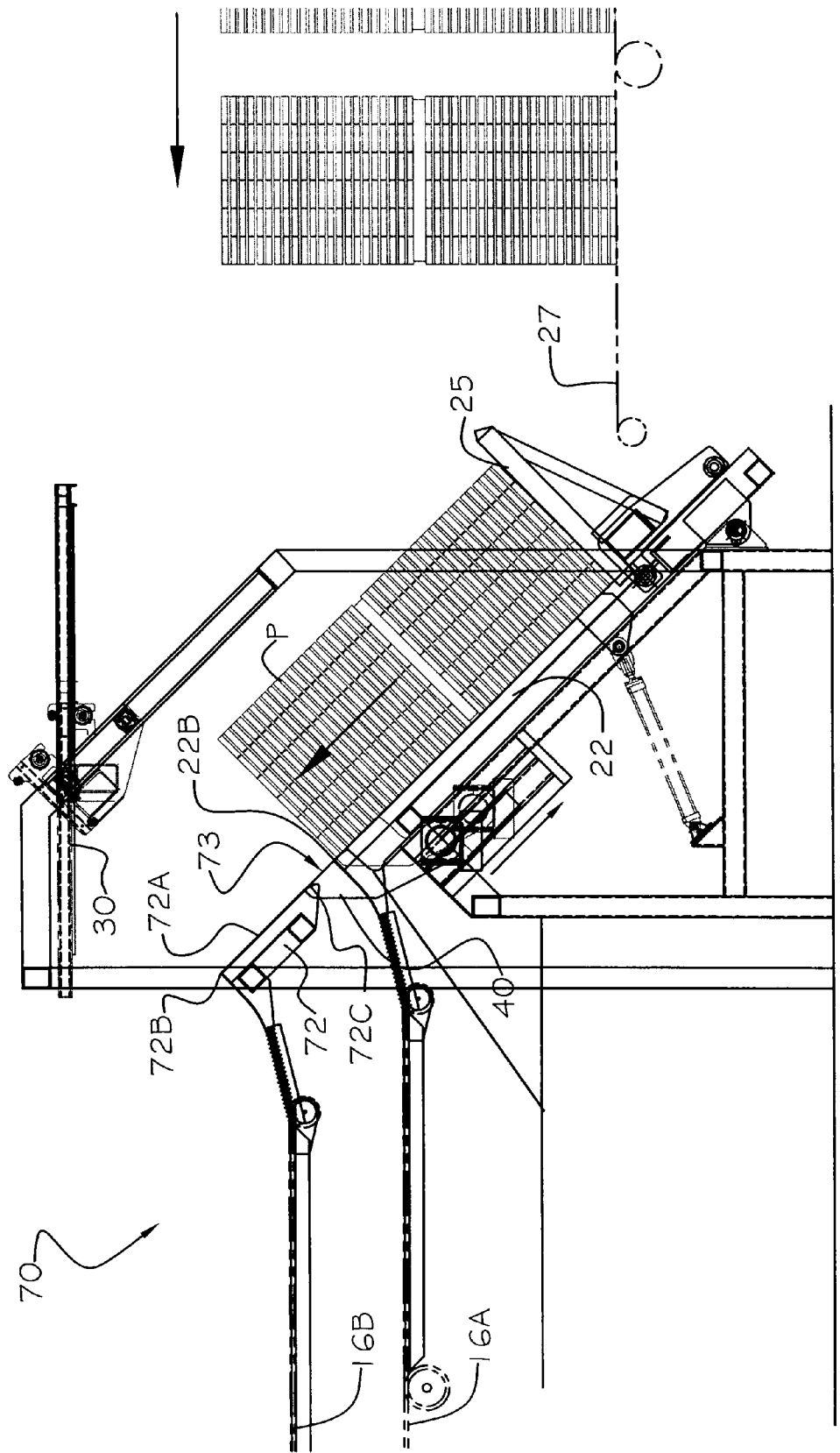
FIGS. 6A to 6E illustrate steps in the operation of a breakdown hoist according to another embodiment.

As shown in FIG. 6A, when extended, extension frame 40 bridges gap 73. This permits packages P to be lifted to a level at which top tiers of the package can spill over top edge 72B. Main lifting arms 25 can lift packages P to at least a hand-off location at which secondary arms 30 can be extended to support the package from below. Secondary arms 30 can then be operated to lift the package P so that the tiers of lumber spill tier-by-tier over top edge 72B.

Figure 6B:
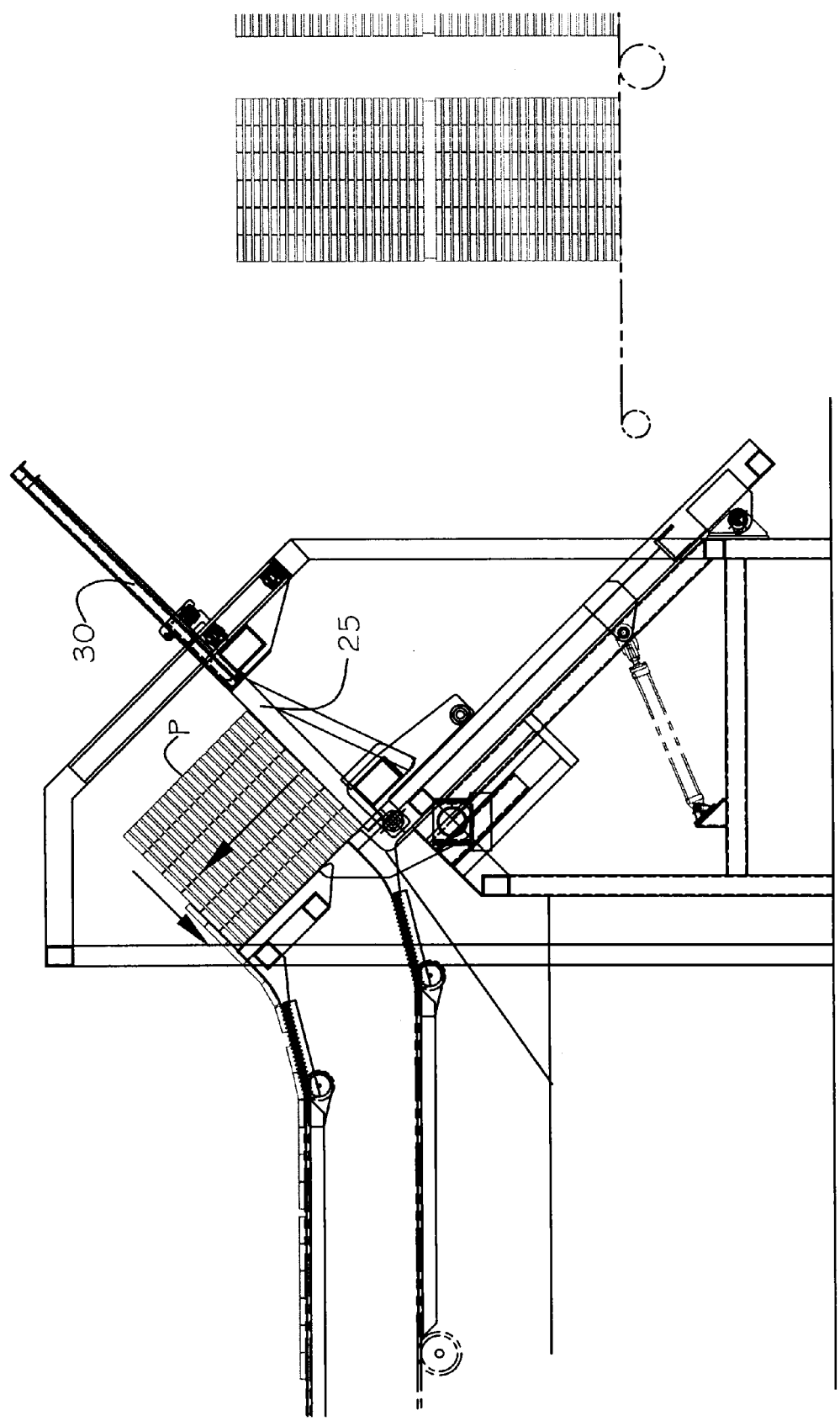

In FIG. 6A, two packages P of lumber have been loaded onto main lifting arms 25 and frame 22 has been tilted into its operating position. In FIG. 6B, main lifting arms 25 have lifted the packages of lumber to the hand-off position. Secondary lifting arms 30 are retracted but are ready to be extended to support packages P.

Figure 6C:
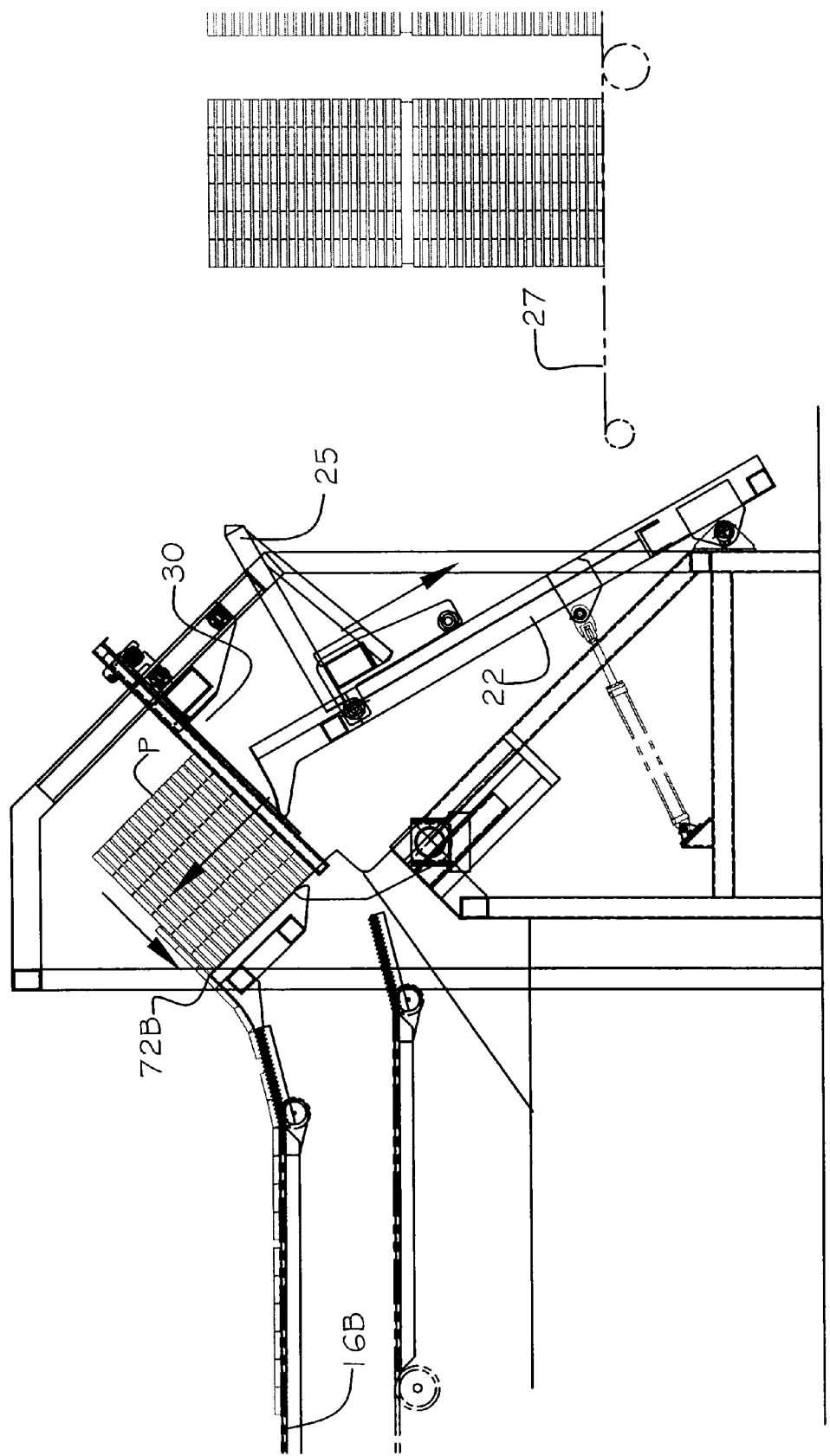

In FIG. 6C, secondary lifting arms 30 are extended and supporting packages P. Packages P have been lifted so that the top tier is ready to spill over top edge 72B onto upper conveyor 16B. Main lifting arms 25 are being lowered to receive one or more packages of lumber from conveyor 27.

Figure 6D:
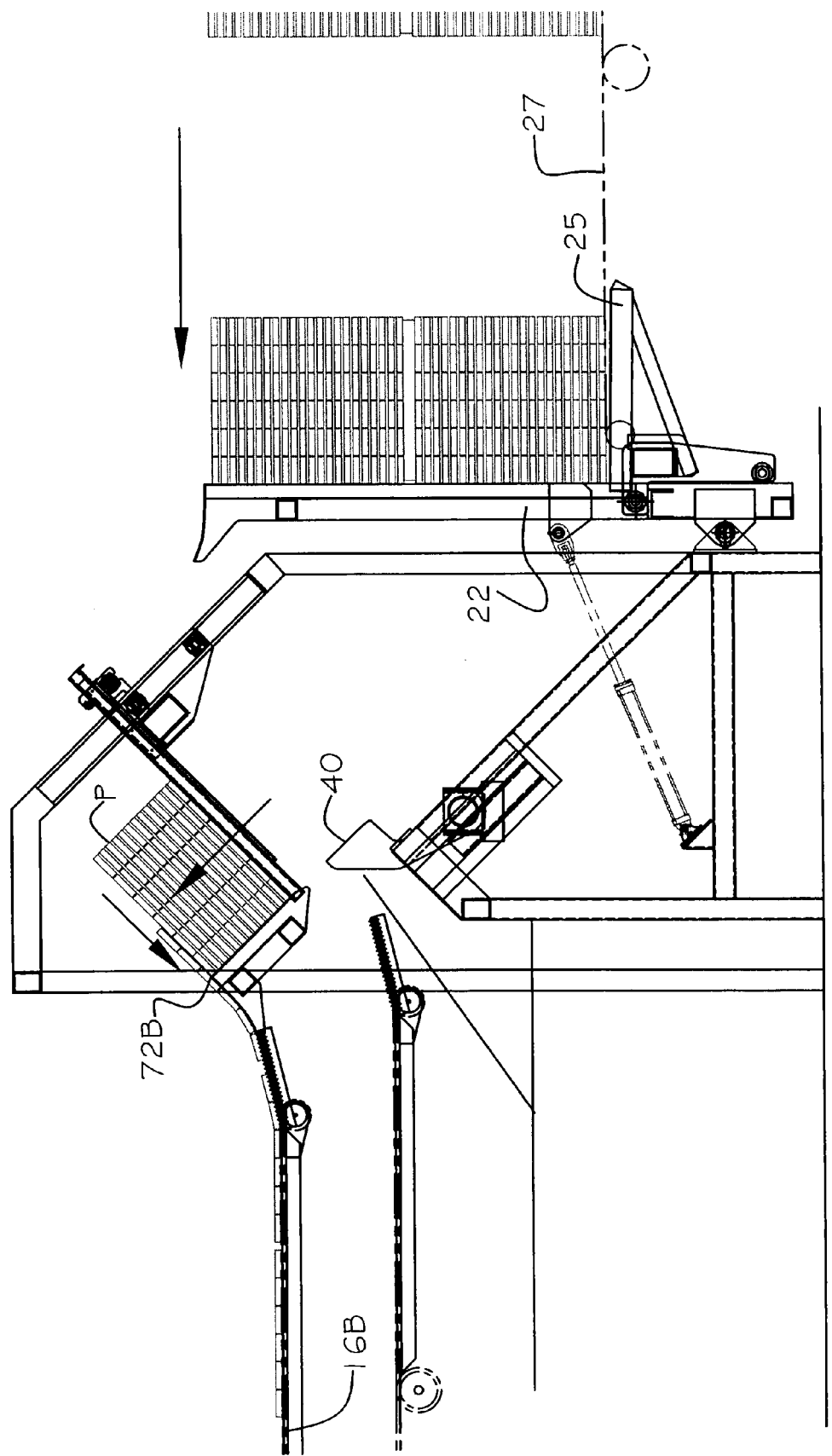

In FIG. 6D, frame 22 has been tilted to receive two new packages P while secondary lifting arms continue to discharge tiers of lumber from the previously-loaded packages P onto upper conveyor 16B. The previously-loaded packages P have passed extension frame 40 and extension frame 40 has been retracted.

Figure 6E:
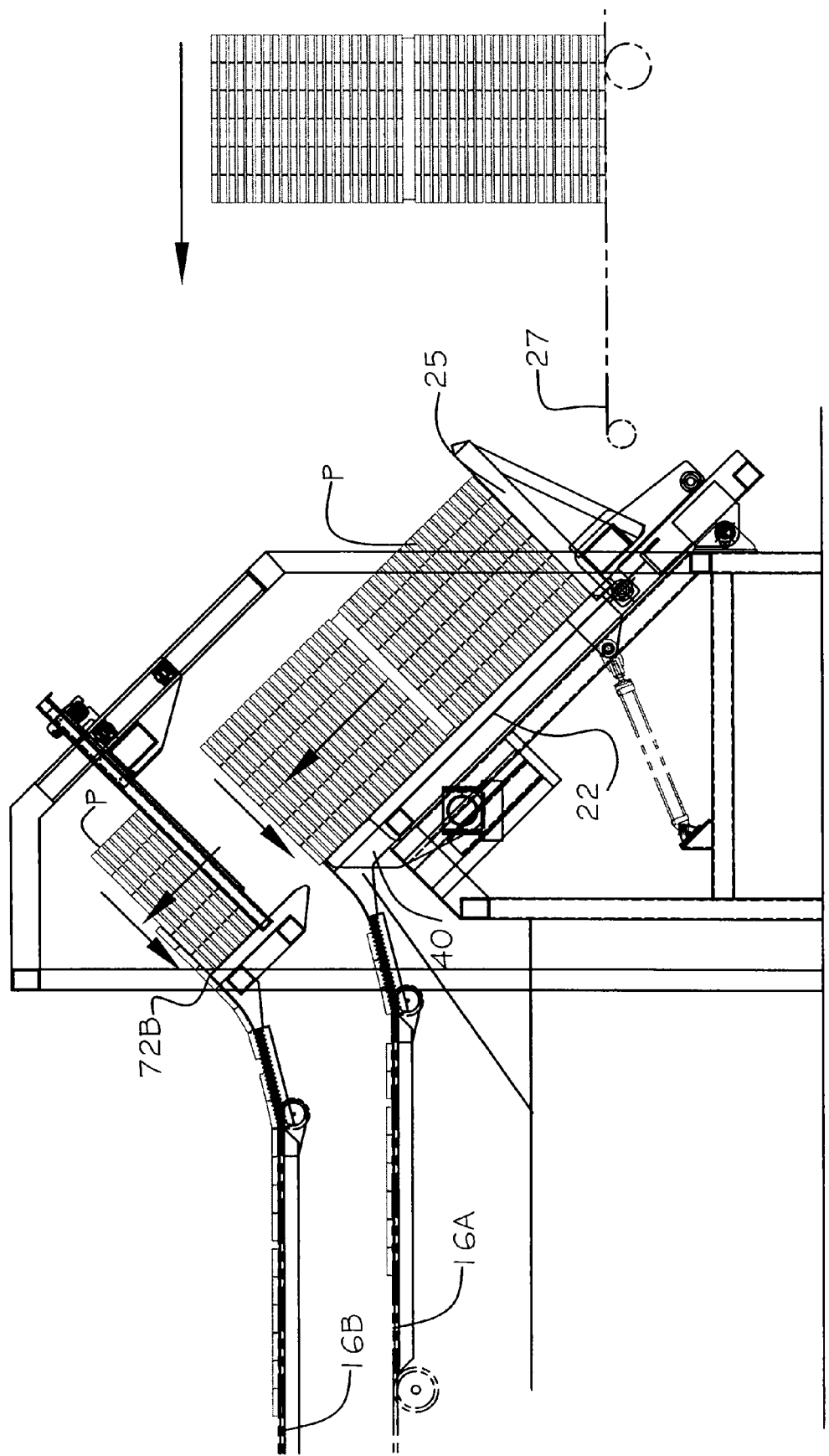

In FIG. 6E, frame 22 has been tilted into its operating position and main lifting arms 25 have been raised to start spilling lumber from the newly-loaded packages P over top edge 22B onto lower conveyor 16A. Secondary lifting arms continue to be operated to discharge tiers of lumber from the previously-loaded packages P onto upper conveyor 16B. The next packages are indexing into position on conveyor 27.

Figure 7:
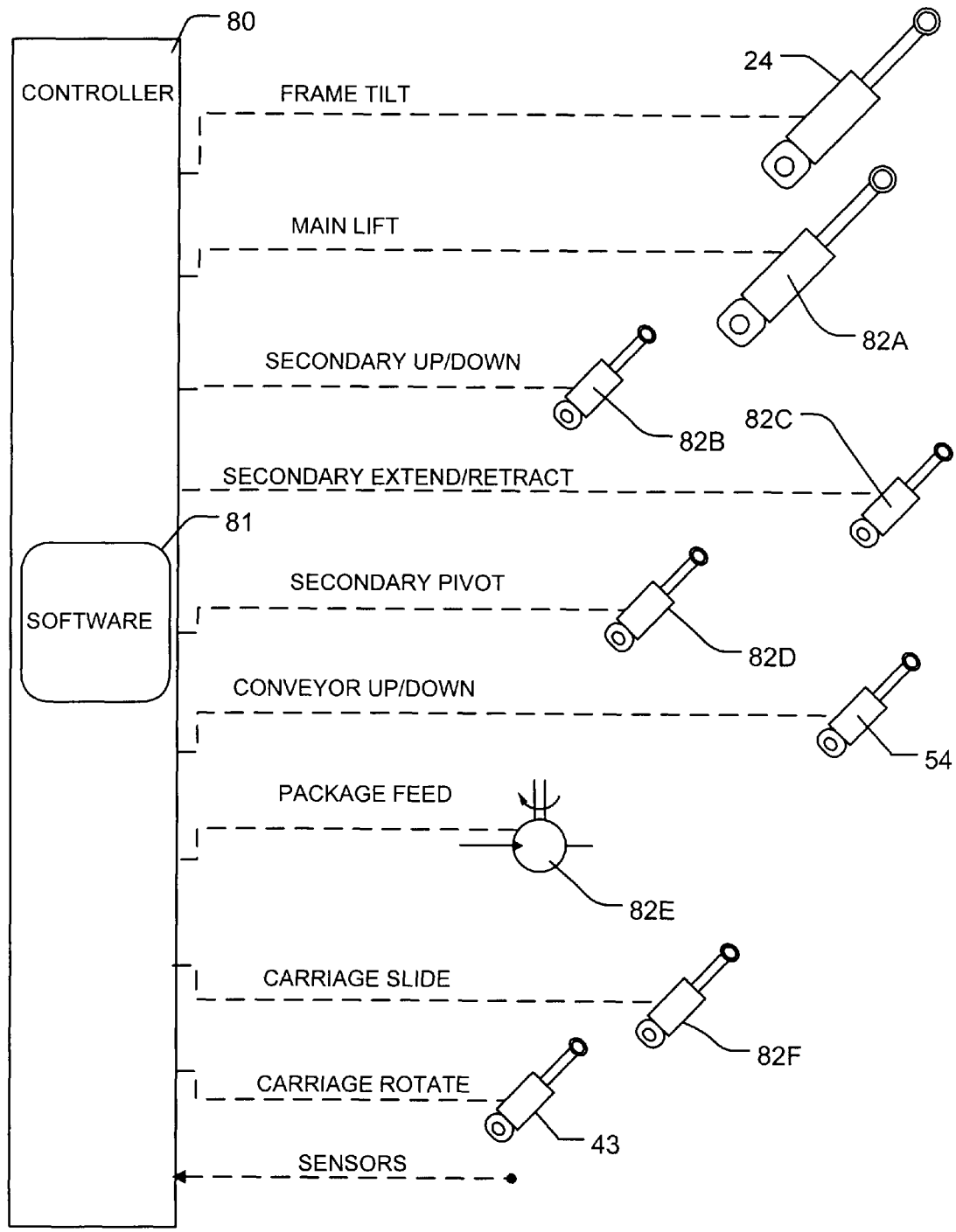
FIG. 7 illustrates a control system for the breakdown hoist of FIGS. 2A and 2B.

The operation of apparatus according to any of the embodiments described herein may be controlled by a suitably programmed controller, such as a PLC, computer, or other data processor that controls the operation of actuators that operate the apparatus. FIG. 7 shows schematically a control system that may be incorporated into a breakdown hoist 20 of the type shown in FIG. 2A. Similar control systems may be provided for breakdown hoists according to other embodiments.

The control system has a controller 80 that receives inputs from sensors in breakdown hoist 20. Software 81 controls actuators that operate apparatus 20 in a desired mode of operation in response to the sensor inputs. In addition to the actuators 24, 43 and 54 which are expressly mentioned above, FIG. 7 shows an actuator 82A for raising and lowering main lift 25, an actuator 82B for moving secondary arms 30 up or down along track 32, an actuator 82C for extending and retracting secondary arms 30, an actuator 82D for pivoting secondary arms 30, an actuator 82E for operating package feed conveyor 27, and an actuator 82F for moving carriage 42. The sensor signals may include position and/or velocity signals from some or all of the actuators that operate breakdown hoist 20.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

Any suitable actuators may be used to implement a breakdown hoist. The actuators may, for example, comprise pneumatic or hydraulic cylinders, electrically driven linear actuators, electric, hydraulic or pneumatic motors, or the like. The actuators may be connected directly to an actuated component or may be connected to the component by way of a suitable linkage, transmission or the like.

Accordingly, the scope of the invention is to be construed in accordance with the substance defined by the following claims.

What is claimed is:

1. A breakdown hoist for breaking down packages comprising multiple tiers of lumber, the breakdown hoist comprising:
   a main frame having a top edge and a face,
   a main lift arranged to lift packages along the face of the main frame,
   an extension frame having a face, the extension frame moveable between an extended position wherein the face of the extension frame extends past the top edge of the main frame and a retracted position wherein lumber can spill over the top edge of the main frame,
   a secondary hoist having a lifting support that is extendable to receive and support a package lifted by the main hoist and retractable, the secondary hoist adapted to lift a package to a secondary top edge above the top edge of the main frame, and
   a conveyor having an end that is movable up and down between a first position wherein the end of the conveyor is located to receive lumber that has spilled over the top edge of the main frame and a second position wherein the end of the conveyor is located to receive lumber that has spilled over the secondary top edge.

2. A breakdown hoist according to claim 1 wherein the main frame is movable between a tilted position wherein the face of the main frame is inclined and a loading position wherein the face of the main frame is substantially upright.

3. A breakdown hoist according to claim 2 wherein the secondary hoist is movable up and down along a track that is spaced apart from the main frame and the packages are movable along a path extending between the face of the main frame and the track.

4. A breakdown hoist according to claim 3 wherein the track is substantially parallel to the face of the main frame.

5. A breakdown hoist according to claim 2 wherein the secondary top edge is on a secondary frame that is spaced apart from the main frame by a gap when the main frame is in its tilted position.

6. A breakdown hoist according to claim 5 wherein the extension frame bridges the gap when the extension frame is in its extended position.

7. A breakdown hoist according to claim 1 wherein the secondary top edge is on the extension frame.

8. A breakdown hoist according to claim 7 wherein the extension frame is mounted on a carriage that is slidable up and down relative to the main frame.

9. A breakdown hoist according to claim 8 wherein the extension frame is pivotally mounted to the carriage.

10. A breakdown hoist according to claim 9 wherein the extension frame comprises a plurality of arms that extend substantially parallel to and form a continuation of the face of the main frame when the extension frame is in its extended position.

11. A breakdown hoist according to claim 1 wherein the lifting support of the secondary hoist is pivotable between a lifting orientation wherein the lifting support is substantially parallel to a support surface of the main lift and an orientation wherein the lifting support is substantially horizontal.

12. A breakdown hoist for breaking down packages comprising multiple tiers of lumber, the breakdown hoist comprising:
   a main frame having a top edge and a face,
   a main lift arranged to lift packages along the face of the main frame,
   an extension frame having a face, the extension frame moveable between an extended position wherein the face of the extension frame extends past the top edge of the main frame and a retracted position wherein lumber can spill over the top edge of the main frame,
   a secondary hoist having a lifting support that is extendable to receive and support a package lifted by the main hoist and retractable, the secondary hoist adapted to lift a package to a secondary top edge above the top edge of the main frame, and
   a lower conveyor having an end located to receive lumber that has spilled over the top edge of the main frame and an upper conveyor having an end located to receive lumber that has spilled over the secondary top edge,
   wherein the main frame is movable between a tilted position wherein the face of the main frame is inclined and a loading position wherein the face of the main frame is substantially upright.

* * * * *